US012733003B2

(12) United States Patent
Okano et al.

(10) Patent No.: US 12,733,003 B2
(45) Date of Patent: Sep. 8, 2026

(54) TERMINAL, AND BASE STATION

(71) Applicant: NTT DOCOMO, INC., Tokyo (JP)

(72) Inventors: Mayuko Okano, Tokyo (JP); Naoya Shibaike, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 289 days.

(21) Appl. No.: 18/293,636

(22) PCT Filed: Aug. 3, 2021

(86) PCT No.: PCT/JP2021/028841
§ 371 (c)(1),
(2) Date: Jan. 30, 2024

(87) PCT Pub. No.: WO2023/012909
PCT Pub. Date: Feb. 9, 2023

(65) Prior Publication Data

US 2024/0334435 A1 Oct. 3, 2024

(51) Int. Cl.
*H04L 5/00* (2006.01)
*H04W 72/21* (2023.01)

(52) U.S. Cl.
CPC ........... *H04W 72/21* (2023.01); *H04L 5/0005* (2013.01)

(58) Field of Classification Search
CPC ..... H04L 1/1642; H04L 47/34; H04L 1/1607; H04L 41/0896; H04L 41/147; H04L 41/16; H04L 41/5006; H04L 41/5009; H04L 41/5019; H04L 43/0876; H04L 43/0882; H04L 5/0005; H04L 5/0053; H04L 5/00; H04W 28/06; H04W 28/082; H04W 28/0865; H04W 28/09; H04W 76/15; H04W 88/06; H04W 56/0045; H04W 56/00; H04W 56/0015; H04W 56/0065; H04W 28/0263; H04W 28/0268; H04W 28/20; H04W 28/24; H04W 28/02;
(Continued)

(56) References Cited

U.S. PATENT DOCUMENTS

2019/0044782 A1 2/2019 Zeng et al.
2019/0141742 A1* 5/2019 Zhou .................... H04L 5/0064
(Continued)

FOREIGN PATENT DOCUMENTS

EP 3949631 B1 * 2/2023 ......... H04L 27/2646
EP 4358452 A2 * 4/2024 ............. H04L 5/001
JP 2019-504574 A 2/2019

OTHER PUBLICATIONS

International Search Report issued in PCT/JP2021/028841 on Mar. 15, 2022 (7 pages).
(Continued)

*Primary Examiner* — Nathan S Taylor
(74) *Attorney, Agent, or Firm* — Osha Bergman Watanabe & Burton LLP

(57) ABSTRACT

A terminal includes a control unit configured to determine a number of resource blocks to be used in a second uplink control channel that is used before a terminal-dedicated resource for a first uplink control channel is configured as a value greater than one; and a transmission unit configured to perform transmission by the second uplink control channel using the number of resource blocks.

6 Claims, 32 Drawing Sheets

| PUCCH format | Number of PRBs | |
|---|---|---|
| | 120 kHz | 480 kHz |
| 0 | 5 | 3 |
| 1 | 12 | 3 |

(58) Field of Classification Search
CPC . H04W 72/04; H04W 72/21; H04W 72/0453; H04W 72/1273; H04W 72/231; H01L 21/6875; H01L 21/687; H01L 21/027; H01L 21/304; H01L 21/67; H01L 21/683; G03F 7/707; G03F 7/70975; G03F 7/7095; G03F 7/00; G03F 7/20
See application file for complete search history.

(56) References Cited

U.S. PATENT DOCUMENTS

| | | | | |
|---|---|---|---|---|
| 2022/0078858 | A1* | 3/2022 | Matsuda | H04W 72/23 |
| 2022/0124829 | A1* | 4/2022 | Matsuda | H04W 74/006 |
| 2022/0132620 | A1* | 4/2022 | Yoshimura | H04L 5/0098 |
| 2022/0272690 | A1* | 8/2022 | Tian | H04B 1/69 |
| 2023/0043604 | A1* | 2/2023 | Lee | H04L 1/1812 |
| 2023/0144750 | A1* | 5/2023 | Agiwal | H04W 76/27<br>455/422.1 |
| 2023/0217503 | A1* | 7/2023 | Xu | H04B 1/713<br>370/329 |
| 2023/0231662 | A1* | 7/2023 | Gou | H04L 1/1896<br>370/329 |
| 2024/0039612 | A1* | 2/2024 | Jung | H04B 7/024 |
| 2024/0073910 | A1* | 2/2024 | Zhao | H04W 72/21 |
| 2024/0172167 | A1* | 5/2024 | Wang | H04B 17/328 |

OTHER PUBLICATIONS

Written Opinion of the International Searching Authority issued in PCT/JP2021/028841 on Mar. 15, 2022 (4 pages).
ZTE, Sanechips; “Discussion on the PUCCH enhancements for 52.6 to 71 GHz”; 3GPP TSG RAN WG1 #105-e, R1-2104834; e-Meeting; May 10-27, 2021 (10 pages).
NTT DOCOMO, Inc.; “PUCCH format 0/1/4 enhancements for NR from 52.6 to 71 GHz”; 3GPP TSG RAN WG1 Meeting #105-e, R1-2105689; Electronic Meeting; May 10-27, 2021 (11 pages).
3GPP TS 38.213 V16.6.0; “3rd Generation Partnership Project; Technical Specification Group Radio Access Network; NR; Physical layer procedures for control (Release 16)”; Jun. 2021 (187 pages).
3GPP TS 38.211 V16.4.0; “3rd Generation Partnership Project; Technical Specification Group Radio Access Network; NR; Physical channels and modulation (Release 16)”; Dec. 2020 (133 pages).

* cited by examiner

FIG.5

PUCCH RB size in Rel-15/16

| | PUCCH format 0 | PUCCH format 1 | PUCCH format 2 | PUCCH format 3 | PUCCH format 4 |
|---|---|---|---|---|---|
| RB size | 1 RB | 1 RB | 1 -16 RBs | 1 -16 RBs | 1 RB |

PUCCH RB size in Rel-17 (for 120 kHz SCS)

| | PUCCH format 0 | PUCCH format 1 | PUCCH format 2 | PUCCH format 3 | PUCCH format 4 |
|---|---|---|---|---|---|
| RB size | [1-12] RB | [1-12] RB | 1 -16 RBs | 1 -16 RBs | [1-12] RB |

(a) Cell-specific PUCCH resource sets

| 4-bit RMSI | PUCCH format | First symbol | Number of symbols | PRB offset | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

(b) UE-specific PUCCH resources

| 3-bit DCI | 1-bit derived from CCE index | Hopping direction | UE specific PRB offset | Initial CS index |
|---|---|---|---|---|
| 000 | 0 | 0 | 0 | 0 |
| | 1 | | | 3 |
| 001 | 0 | | | 6 |
| | 1 | | | 9 |
| 010 | 0 | | 1 | 0 |
| | 1 | | | 3 |
| 011 | 0 | | | 6 |
| | 1 | | | 9 |
| 100 | 0 | 1 | 0 | 0 |
| | 1 | | | 3 |
| 101 | 0 | | | 6 |
| | 1 | | | 9 |
| 110 | 0 | | 1 | 0 |
| | 1 | | | 3 |
| 111 | 0 | | | 6 |
| | 1 | | | 9 |

| PUCCH format | Number of PRBs | |
|---|---|---|
| | 120 kHz | 480 kHz |
| 0 | 5 | 3 |
| 1 | 12 | 3 |

FIG.11

Cell-specific PUCCH resource sets

| 4-bit RMSI | PUCCH format | First symbol | Number of symbols | Number of PRBs | | PRB offset | Set of initial CS indexes |
|---|---|---|---|---|---|---|---|
| | | | | 120 kHz | 480 kHz | | |
| 0000 | 0 | 12 | 2 | 5 | 2 | 0 | {0, 3} |
| 0001 | 0 | 12 | 2 | 5 | 2 | 0 | {0, 4, 8} |
| 0010 | 0 | 12 | 2 | 5 | 2 | 3 | {0, 4, 8} |
| 0011 | 1 | 10 | 4 | 5 | 2 | 0 | {0, 6} |
| 0100 | 1 | 10 | 4 | 5 | 2 | 0 | {0, 3, 6, 9} |
| 0101 | 1 | 10 | 4 | 5 | 2 | 2 | {0, 3, 6, 9} |
| 0110 | 1 | 10 | 4 | 5 | 2 | 4 | {0, 3, 6, 9} |
| 0111 | 1 | 4 | 10 | 10 | 3 | 0 | {0, 6} |
| 1000 | 1 | 4 | 10 | 10 | 3 | 0 | {0, 3, 6, 9} |
| 1001 | 1 | 4 | 10 | 10 | 3 | 2 | {0, 3, 6, 9} |
| 1010 | 1 | 4 | 10 | 10 | 3 | 4 | {0, 3, 6, 9} |
| 1011 | 1 | 0 | 14 | 12 | 5 | 0 | {0, 6} |
| 1100 | 1 | 0 | 14 | 12 | 5 | 0 | {0, 3, 6, 9} |
| 1101 | 1 | 0 | 14 | 12 | 5 | 2 | {0, 3, 6, 9} |
| 1110 | 1 | 0 | 14 | 12 | 5 | 4 | {0, 3, 6, 9} |
| 1111 | 1 | 0 | 14 | 12 | 5 | Floor($N_{BWP}$/4) | {0, 3, 6, 9} |

FIG.12

UE-specific PUCCH resources

| 3-bit DCI | 1-bit derived from CCE index | Hopping direction | Number of PRBs | | UE specific PRB offset | Initial CS index |
|---|---|---|---|---|---|---|
| | | | 120 kHz SCS | 480 kHz SCS | | |
| 000 | 0 | 0 | 5 | 5 | 0 | 0 |
| | 1 | | | | | 3 |
| 001 | 0 | | | | | 6 |
| | 1 | | | | | 9 |
| 010 | 0 | | 12 | 12 | 1 | 0 |
| | 1 | | | | | 3 |
| 011 | 0 | | | | | 6 |
| | 1 | | | | | 9 |
| 100 | 0 | 1 | 5 | 5 | 0 | 0 |
| | 1 | | | | | 3 |
| 101 | 0 | | | | | 6 |
| | 1 | | | | | 9 |
| 110 | 0 | | 12 | 12 | 1 | 0 |
| | 1 | | | | | 3 |
| 111 | 0 | | | | | 6 |
| | 1 | | | | | 9 |

FIG.13

| UE power class | Number of PRBs | |
|---|---|---|
| | 120 kHz | 480 kHz |
| 1 | 20 | 8 |
| 2, 3, 4 | 12 | 3 |

FIG.14

Cell-specific PUCCH resource sets

| 4-bit RMSI | PUCCH format | First symbol | Number of symbols | PRB offset | Set of initial CS indexes |
|---|---|---|---|---|---|
| : | : | : | : | : | : |
| 1100 | 1 | 0 | 14 | 0 | {0, 3, 6, 9} |
| 1101 | 1 | 0 | 14 | 10 | {0, 3, 6, 9} |
| 1110 | 1 | 0 | 14 | 20 | {0, 3, 6, 9} |
| : | : | : | : | : | : |

FIG.15

Cell-specific PUCCH resource sets

| 4-bit RMSI | PUCCH format | First symbol | Number of symbols | PRB offset index | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

FIG.17

Cell-specific PUCCH resource sets

| 4-bit RMSI | PUCCH format | First symbol | Number of symbols | PRB offset | Set of initial CS indexes |
|---|---|---|---|---|---|
| : | : | : | : | : | : |
| 1100 | 1 | 0 | 14 | 0 | {0, 3, 6, 9} |
| 1101 | 1 | 0 | 14 | 5 | {0, 3, 6, 9} |
| 1110 | 1 | 0 | 14 | 10 | {0, 3, 6, 9} |
| : | : | : | : | : | : |

FIG.18

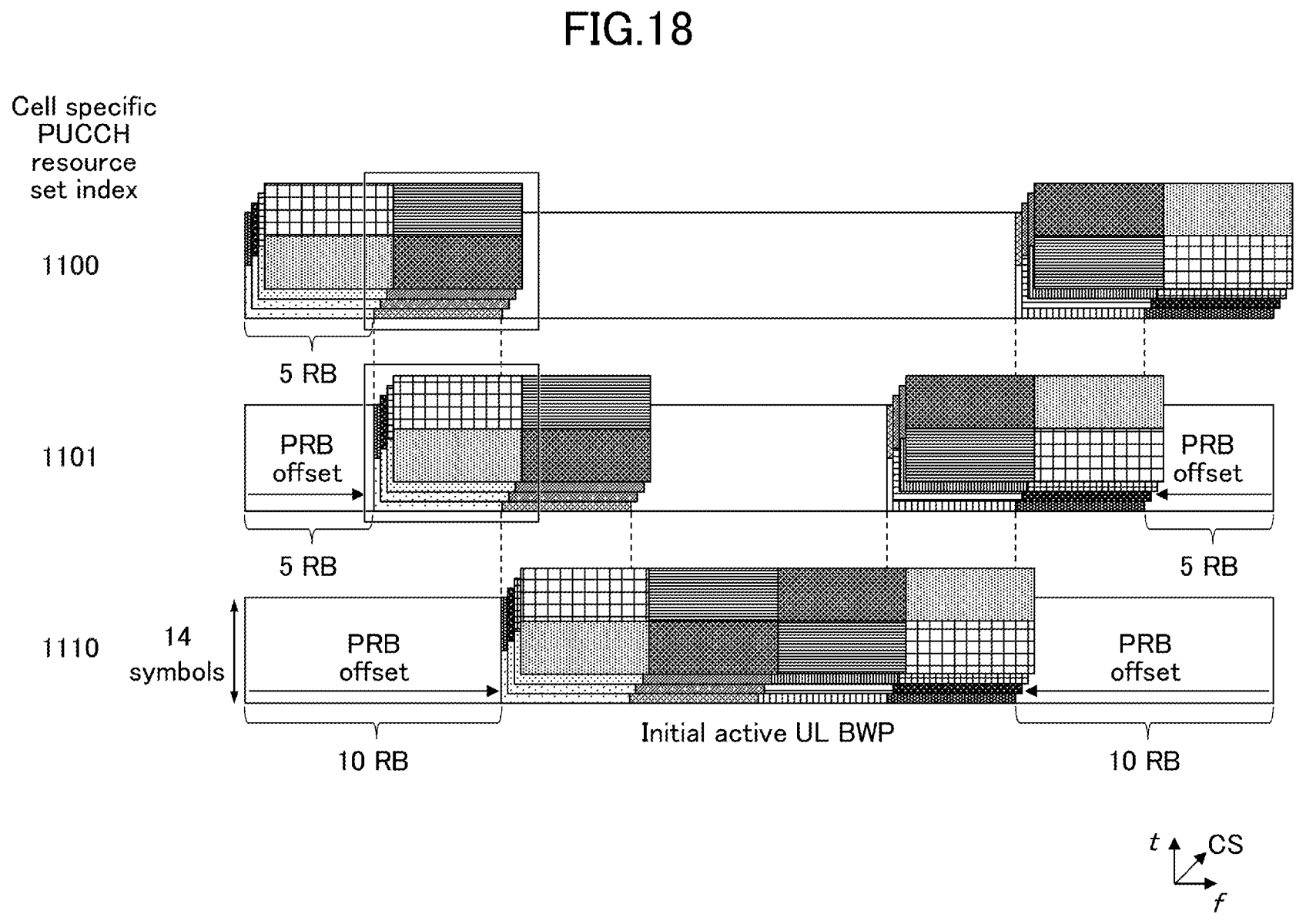

Cell specific PUCCH resource set index

1100

1101

1110

14 symbols

5 RB

PRB offset

5 RB

PRB offset

10 RB

PRB offset

5 RB

PRB offset

10 RB

Initial active UL BWP t

Cell-specific PUCCH resource sets

| 4-bit RMSI | PUCCH format | First symbol | Number of symbols | PRB offset | Set of initial CS indexes |
|---|---|---|---|---|---|
| : | : | : | : | : | : |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| : | : | : | : | : | : |

FIG.21

UE-specific PUCCH resources

| 3-bit DCI | 1-bit derived from CCE index | Hopping direction | UE specific PRB offset | Initial CS index |
|---|---|---|---|---|
| 000 | 0 | 0 | 0 | 0 |
| | 1 | | | 3 |
| 001 | 0 | | | 6 |
| | 1 | | | 9 |
| 010 | 0 | | 5 | 0 |
| | 1 | | | 3 |
| 011 | 0 | | | 6 |
| | 1 | | | 9 |
| 100 | 0 | 1 | 0 | 0 |
| | 1 | | | 3 |
| 101 | 0 | | | 6 |
| | 1 | | | 9 |
| 110 | 0 | | 5 | 0 |
| | 1 | | | 3 |
| 111 | 0 | | | 6 |
| | 1 | | | 9 |

FIG.22

UE-specific PUCCH resources

| 3-bit DCI | 1-bit derived from CCE index | Hopping direction | UE specific PRB offset index | Initial CS index |
|---|---|---|---|---|
| 000 | 0 | 0 | 0 | 0 |
| | 1 | | | 3 |
| 001 | 0 | | | 6 |
| | 1 | | | 9 |
| 010 | 0 | | 1 | 0 |
| | 1 | | | 3 |
| 011 | 0 | | | 6 |
| | 1 | | | 9 |
| 100 | 0 | 1 | 0 | 0 |
| | 1 | | | 3 |
| 101 | 0 | | | 6 |
| | 1 | | | 9 |
| 110 | 0 | | 1 | 0 |
| | 1 | | | 3 |
| 111 | 0 | | | 6 |
| | 1 | | | 9 |

FIG.23

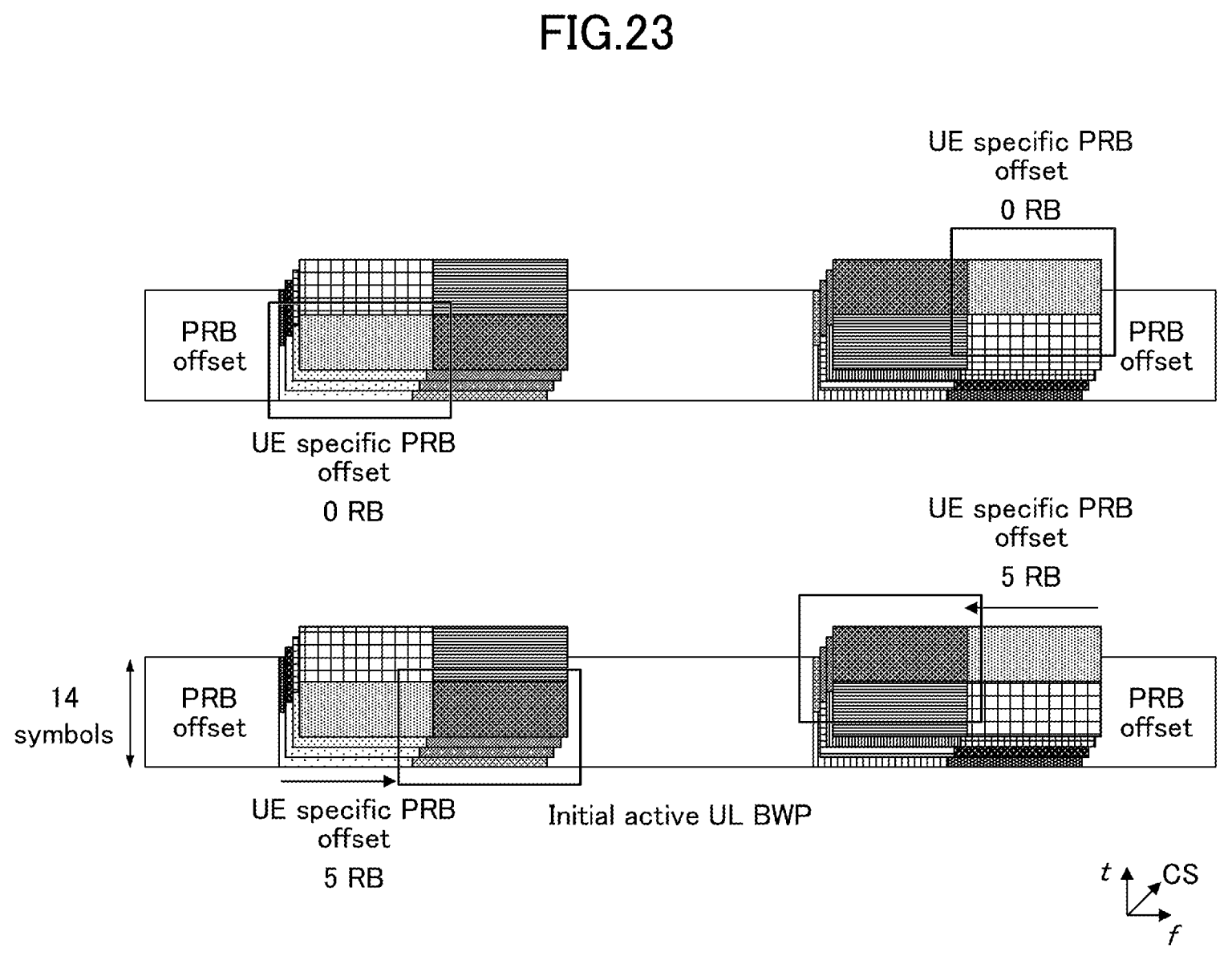

PRB offset

UE specific PRB offset
0 RB

UE specific PRB offset
0 RB

PRB offset

PRB offset

UE specific PRB offset
5 RB

Initial active UL BWP

UE specific PRB offset
5 RB

PRB offset 14 symbols t
CS
f

Region A
Region B
Region C
PRB offset
PRB offset
PRB offset
PRB offset
PRB offset
PRB offset
4 RB
12 RB
6 RB
14 symbols
Initial active UL BWP
t
CS
f Cell specific PRB offset
Cell specific PRB offset
Initial active UL BWP
14 symbols
t
CS
f

FIG.26

Ex. For Alt.1: Cell-specific PUCCH resource sets

| 4-bit RMSI | PUCCH format | First symbol | Number of symbols | PRB offset | | Set of initial CS indexes |
|---|---|---|---|---|---|---|
| | | | | FH ON | FH OFF | |
| 0000 | 0 | 12 | 2 | 0 | 0 | {0, 3} |
| 0001 | 0 | 12 | 2 | 0 | 0 | {0, 4, 8} |
| 0010 | 0 | 12 | 2 | 3 | 12 | {0, 4, 8} |
| 0011 | 1 | 10 | 4 | 0 | 0 | {0, 6} |
| 0100 | 1 | 10 | 4 | 0 | 0 | {0, 3, 6, 9} |
| 0101 | 1 | 10 | 4 | 2 | 12 | {0, 3, 6, 9} |
| 0110 | 1 | 10 | 4 | 4 | 24 | {0, 3, 6, 9} |
| 0111 | 1 | 4 | 10 | 0 | 0 | {0, 6} |
| 1000 | 1 | 4 | 10 | 0 | 0 | {0, 3, 6, 9} |
| 1001 | 1 | 4 | 10 | 2 | 12 | {0, 3, 6, 9} |
| 1010 | 1 | 4 | 10 | 4 | 24 | {0, 3, 6, 9} |
| 1011 | 1 | 0 | 14 | 0 | 0 | {0, 6} |
| 1100 | 1 | 0 | 14 | 0 | 0 | {0, 3, 6, 9} |
| 1101 | 1 | 0 | 14 | 2 | 12 | {0, 3, 6, 9} |
| 1110 | 1 | 0 | 14 | 4 | 24 | {0, 3, 6, 9} |
| 1111 | 1 | 0 | 14 | Floor ($N_{BWP}$/4) | 24 | {0, 3, 6, 9} |

FIG.27

Ex. For Alt.2: Cell-specific PUCCH resource sets

| 4-bit RMSI | PUCCH format | First symbol | Number of symbols | PRB offset index | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

FIG.28

UE-specific PUCCH resources

| 3-bit DCI | 1-bit derived from CCE index | UE specific symbol offset index | Initial CS index |
|---|---|---|---|
| 000 | 0 | 0 | 0 |
| | 1 | | 3 |
| 001 | 0 | | 6 |
| | 1 | | 9 |
| 010 | 0 | 1 | 0 |
| | 1 | | 3 |
| 011 | 0 | | 6 |
| | 1 | | 9 |
| 100 | 0 | 2 | 0 |
| | 1 | | 3 |
| 101 | 0 | | 6 |
| | 1 | | 9 |

FIG.30

TS 38.211 v16.4.0 table 6.3.2.4.1-2

Orthogonal sequences $w_i(m) = e^{j2\pi\phi(m)/N_{SF,m'}^{PUCCH,1}}$ for PUCCH format 1.

| $N_{SF,m'}^{PUCCH,1}$ | $\phi$ | | | | | | |
|---|---|---|---|---|---|---|---|
| | $i = 0$ | $i = 1$ | $i = 2$ | $i = 3$ | $i = 4$ | $i = 5$ | $i = 6$ |
| 1 | [0] | – | – | – | – | – | – |
| 2 | [0 0] | [0 1] | – | – | – | – | – |
| 3 | [0 0 0] | [0 1 2] | [0 2 1] | – | – | – | – |
| 4 | [0 0 0 0] | [0 2 0 2] | [0 0 2 2] | [0 2 2 0] | – | – | – |
| 5 | [0 0 0 0 0] | [0 1 2 3 4] | [0 2 4 1 3] | [0 3 1 4 2] | [0 4 3 2 1] | – | – |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | – |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

Where $i$ is the index of orthogonal sequence (a) Cell-specific PUCCH resource sets

| 4-bit RMSI | PUCCH format | First symbol | Number of symbols | PRB offset | Set of initial CS indexes | Set of OCC indexes |
|---|---|---|---|---|---|---|
| 0000 | 0 | 12 | 2 | 0 | {0, 3} | – |
| 0001 | 0 | 12 | 2 | 0 | {0, 4, 8} | – |
| 0010 | 0 | 12 | 2 | 3 | {0, 4, 8} | – |
| 0011 | 1 | 10 | 4 | 0 | {0, 6} | {0, 1, 2} |
| 0100 | 1 | 10 | 4 | 0 | {0, 3, 6, 9} | {0, 1} |
| 0101 | 1 | 10 | 4 | 2 | {0, 3, 6, 9} | {0, 1} |
| 0110 | 1 | 10 | 4 | 4 | {0, 3, 6, 9} | {0, 1} |
| 0111 | 1 | 4 | 10 | 0 | {0, 6} | {0, 1, 2, 3} |
| 1000 | 1 | 4 | 10 | 0 | {0, 3, 6, 9} | {0, 1} |
| 1001 | 1 | 4 | 10 | 2 | {0, 3, 6, 9} | {2, 3} |
| 1010 | 1 | 4 | 10 | 4 | {0, 3, 6, 9} | {4, 5} |
| 1011 | 1 | 0 | 14 | 0 | {0, 6} | {0, 1, 2, 3} |
| 1100 | 1 | 0 | 14 | 0 | {0, 3, 6, 9} | {0, 1} |
| 1101 | 1 | 0 | 14 | 2 | {0, 3, 6, 9} | {2, 3} |
| 1110 | 1 | 0 | 14 | 4 | {0, 3, 6, 9} | {4, 5} |
| 1111 | 1 | 0 | 14 | Floor($N_{BWP}$/4) | {0, 3, 6, 9} | {0, 1, 2} |

(b) UE-specific PUCCH resources

| 3-bit DCI | 1-bit derived from CCE index | Hopping direction | OCC index | Initial CS index |
|---|---|---|---|---|
| 000 | 0 | 0 | 2 | 0 |
| | 1 | | | 3 |
| 001 | 0 | | | 6 |
| | 1 | | | 9 |
| 010 | 0 | | 3 | 0 |
| | 1 | | | 3 |
| 011 | 0 | | | 6 |
| | 1 | | | 9 |
| 100 | 0 | 1 | 2 | 0 |
| | 1 | | | 3 |
| 101 | 0 | | | 6 |
| | 1 | | | 9 |
| 110 | 0 | | 3 | 0 |
| | 1 | | | 3 |
| 111 | 0 | | | 6 |
| | 1 | | | 9 |

TERMINAL, AND BASE STATION

TECHNICAL FIELD

The present invention relates to a terminal and a base station in a radio communication system.

BACKGROUND ART

In NR (New Radio) (also referred to as "5G") that is a successor system of long term evolution (LTE), techniques for satisfying requirements such as a large-capacity system, a high-speed data transmission rate, low delay, simultaneous connection of a large number of terminals, low cost, and power saving have been studied. In addition, in NR, it is considered to use a high-frequency band such as 52.6 to 71 GHz or 24.25 to 71 GHz.

Also, in NR, in order to expand frequency bands, use of a frequency band (also referred to as "unlicensed band," "unlicensed carrier," or "unlicensed CC") that is different from a licensed band licensed to an operator. In NR, a system that supports an unlicensed band is referred to as an NR-U system.

RELATED ART DOCUMENT

Non-Patent Documents

Non-Patent Document 1: 3GPP TS 38.213 V16.6.0 (2021-06)

Non-Patent Document 2: 3GPP TS 38.211 V16. 4.0 (2020-12)

SUMMARY OF THE INVENTION

Problems to be Solved by the Invention

In NR, a physical uplink control channel (PUCCH) is used as a channel for transmitting uplink control information (for example, Non-Patent Documents 1 and 2). Note that the PUCCH is an example of an uplink control channel.

In a related art, a PUCCH format0 or 1 is used as a PUCCH format before configuration of an individual PUCCH resource. In PUCCH transmission, it is desirable to perform transmission with a large transmission power within a range not exceeding the maximum transmission power limited by a rule or the like from the viewpoint of coverage or the like.

However, in the related art, only 1 is used as the number of resource blocks (RBs) of the PUCCH resource in the PUCCH format0 or 1. Transmission power cannot be made large by the only one RB.

The present invention has been made in view of the above, and an object of the present invention is to provide a technique that enables a terminal to perform transmission on an uplink control channel using RBs the number of which is larger than one.

Means for Solving the Problem

According to the disclosed technique, there is provided a terminal including:

a control unit configured to determine a number of resource blocks to be used in a second uplink control channel that is used before a terminal-dedicated resource for a first uplink control channel is configured as a value greater than one; and a transmission unit configured to perform transmission by the second uplink control channel using the number of resource blocks.

Effects of the Invention

According to the disclosed technique, a technique is provided that enables a terminal to perform transmission on an uplink control channel using RBs the number of which is larger than one.

BRIEF DESCRIPTION OF THE DRAWINGS

FIG. 5 is a diagram showing an example of an RB size of a PUCCH.

FIG. 11 is a diagram for explaining Example 1;

FIG. 12 is a diagram for explaining Example 1;

FIG. 13 is a diagram for explaining Example 1;

FIG. 14 is a diagram for explaining Example 2;

FIG. 15 is a diagram for explaining Example 2;

FIG. 17 is a diagram for explaining Example 2;

FIG. 18 is a diagram for explaining Example 2;

FIG. 19 is a diagram for explaining Example 2;

FIG. 21 is a diagram for explaining Example 2;

FIG. 22 is a diagram for explaining the second embodiment;

FIG. 23 is a diagram for explaining Example 2;

FIG. 26 is a diagram for explaining Example 2;

FIG. 27 is a diagram for explaining Example 2;

FIG. 28 is a diagram for explaining Example 2;

FIG. 30 is a diagram for explaining Example 4;

DETAILED DESCRIPTION OF THE INVENTION

Hereinafter, embodiments of the present invention will be described with reference to the drawings. The embodiment described below is an example, and the embodiment to which the present invention is applied is not limited to the following embodiments.

In the operation of the radio communication system according to the embodiment of the present invention, existing techniques are used as appropriate. The existing technology is, for example, existing NR (e.g., Non-Patent Documents 1 and 2). The radio communication system (a base station 10 and a terminal 20) according to the present embodiment basically operates in accordance with an existing standard. However, in order to solve the problem in the case where use of the high frequency band is assumed, the base station 10 and the terminal 20 also perform operations that are not included in the existing specification. In the description of Examples to be described later, operations that are not defined in the existing specifications are mainly described. Note that numerical values described below are all examples.

In the embodiments of the present invention, the duplex scheme may be a time division duplex (TDD) scheme, a frequency division duplex (FDD) scheme, or another scheme (for example, flexible duplex).

In the embodiments of the present invention, "configuring" a radio parameter or the like may mean that a predetermined value is pre-configured or that a radio parameter notified from the base station 10 or the terminal 20 is configured. Note that the notation "A/B" used in the present embodiment means "A or B, or A and B".

(System Configuration)

Figure 1:
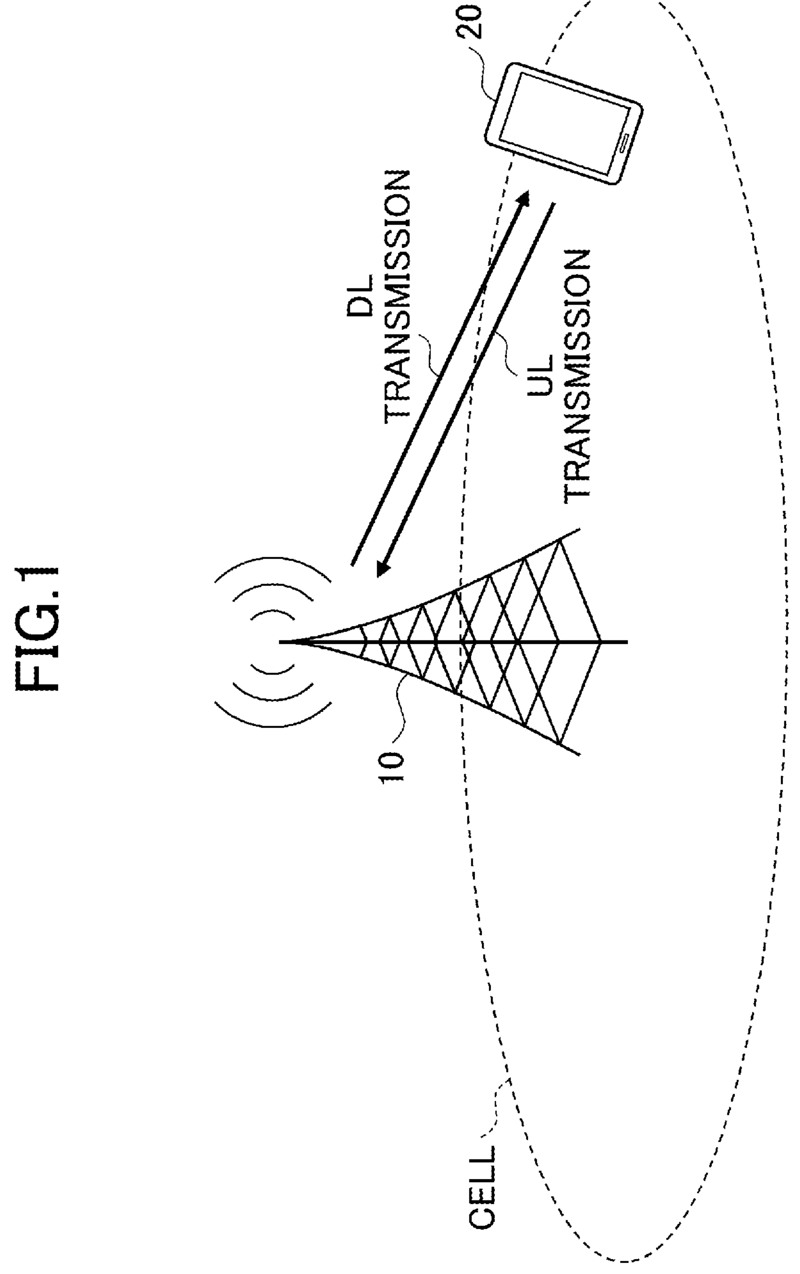
FIG. 1 is a diagram for explaining a radio communication system according to an embodiment of the present invention.

FIG. 1 is a diagram for explaining a radio communication system according to an embodiment of the present invention. As shown in FIG. 1, the radio communication system according to the embodiment of the present invention includes a base station 10 and a terminal 20. Although one base station 10 and one terminal 20 are illustrated in FIG. 1, this is merely an example, and a plurality of base stations 10 and a plurality of terminals 20 may be provided.

The base station 10 is a communication apparatus that provides one or more cells and performs radio communication with the terminal 20. The physical resources of radio signals are defined in the time domain and the frequency domain.

OFDM is used as a radio access scheme. In the frequency-domain, at least 15 kHz, 30 kHz, 120 kHz, and 240 kHz are supported as sub-carrier spacing (SCS). In the present embodiment, a larger SCS is supported. Further, a resource block is formed with a predetermined number (for example, 12) of consecutive subcarriers regardless of SCS.

The terminal 20 detects an SSB (SS/PBCH block) when performing initial access, and identifies the SCS in a PDCCH and a PDSCH based on a PBCH included in the SSB.

In the time domain, a slot is formed with a plurality of OFDM symbols (for example, 14 symbols regardless of the subcarrier spacing). Hereinafter, an OFDM symbol is referred to as a "symbol". A slot is a scheduling unit. Further, a subframe of a 1 ms section is defined, and a frame including 10 subframes is defined. The number of symbols per slot is not limited to 14.

As illustrated in FIG. 1, the base station 10 transmits control information or data to the terminal 20 in downlink (DL), and receives control information or data from the terminal 20 in uplink (UL). Both the base station 10 and the terminal 20 can transmit and receive signals by performing beamforming. In addition, both the base station 10 and the terminal 20 can apply communication by multiple input multiple output (MIMO) to DL or UL. In addition, both the base station 10 and the terminal 20 may perform communication via a secondary cell (SCell) and a primary cell (PCell) by carrier aggregation (CA).

The terminal 20 is a communication device having a radio communication function, such as a smartphone, a mobile phone, a tablet, a wearable terminal, and a machine-to-machine (M2M) communication module. As illustrated in FIG. 1, the terminal 20 receives control information or data from the base station 10 in DL and transmits control information or data to the base station 10 in UL, thereby using various communication services provided by the radio communication system.

Figure 2:
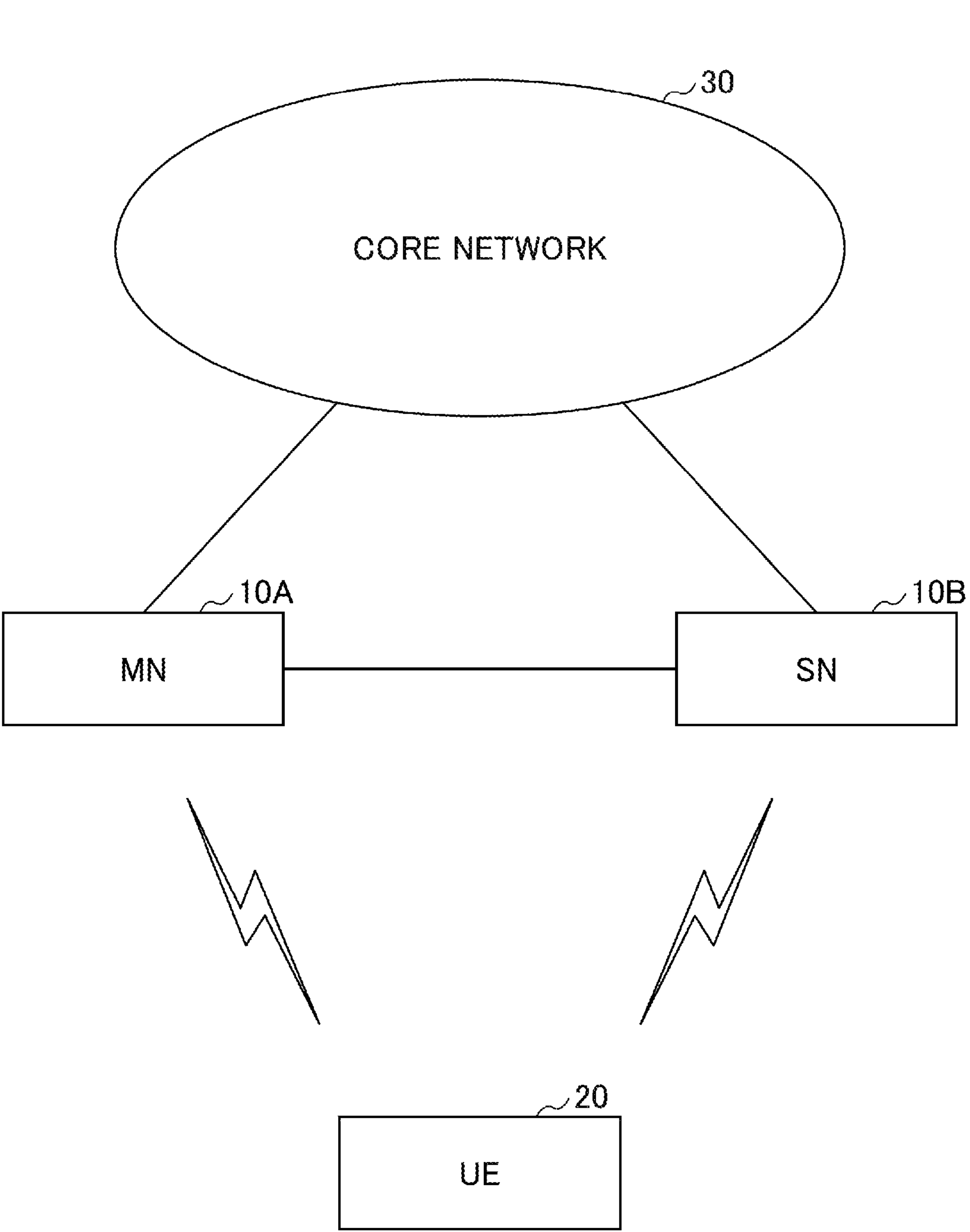
FIG. 2 is a diagram for explaining a radio communication system according to an embodiment of the present invention.

FIG. 2 illustrates a configuration example of a radio communication system in a case where NR-dual connectivity (NR-DC) is executed. As shown in FIG. 2, a base station 10A as a master node (MN) and a base station 10B as a secondary node (SN) are provided. Each of the base stations 10A and 10B is connected to a core network. The terminal 20 communicates with both the base stations 10A and 10B.

A cell group provided by the base station 10A serving as the MN is referred to as a master cell group (MCG), and a cell group provided by the base station 10B serving as the SN is referred to as a secondary cell group (SCG). The operation in this embodiment may be performed in either of the configurations shown in FIGS. 1 and 2.

In the radio communication system according to the present embodiment, when an unlicensed band is used, LBT (Listen Before Talk) is executed. The base station 10 or the terminal 20 performs transmission when an LBT result indicates "idle", and does not perform transmission when the LBT result indicates "busy".

(Frequency Band)

Figure 3:
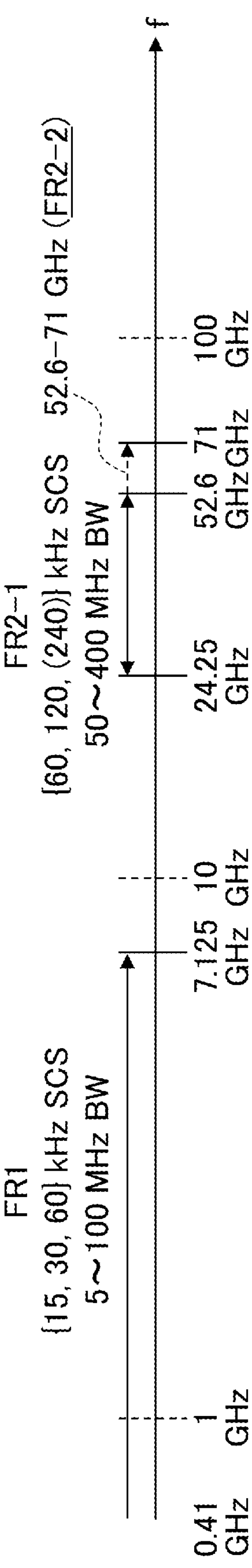
FIG. 3 is a diagram showing an example of a band.

FIG. 3 shows an example of frequency bands used in NR. As a frequency band (may be referred to as a frequency range) in NR, there are three frequency bands of FR1 (0.41 GHz to 7.125 GHZ), FR2-1 (24.25 GHz to 52.6 GHz), and FR2-2 (52.6 GHz to 71 GHz). The FR2-1 and the FR2-2 may be collectively referred to as FR2. As illustrated in FIG. 3, in FR1, 15 kHz, 30 kHz, and 60 kHz are supported as SCSs, and 5 to 100 MHz are supported as bandwidth (BW). In FR2-1, 60 kHz, 120 kHz, and 240 kHz (only SSB) are supported as SCSs, and 50 to 400 MHz are supported as bandwidth (BW).

The radio communication system according to the present embodiment is assumed to use a frequency band of 52.6 GHz to 71 GHz. The frequency band may be an unlicensed band or a licensed band. Note that these are examples, and the technique according to the present invention is not limited to a specific band.

(Limitation of Transmission Power)

For example, there is a regulation related to transmission power depending on regions for a 60 GHz unlicensed band in the above-described high frequency band. For example, in the FCC regulation in the United States for 52.6 GHz to 71 GHz, equivalent isotropically radiated power (EIRP) and conducted power limit are defined as follows.

Max avg, EIRP 40 dBm

Max peak EIRP 43 dBm

If emission-BW is less than 100 MHz, max peak conducted output power is {500 mW×emission-BW/100 MHz}

Otherwise, max peak conducted output power is 500 mW

Figure 4:
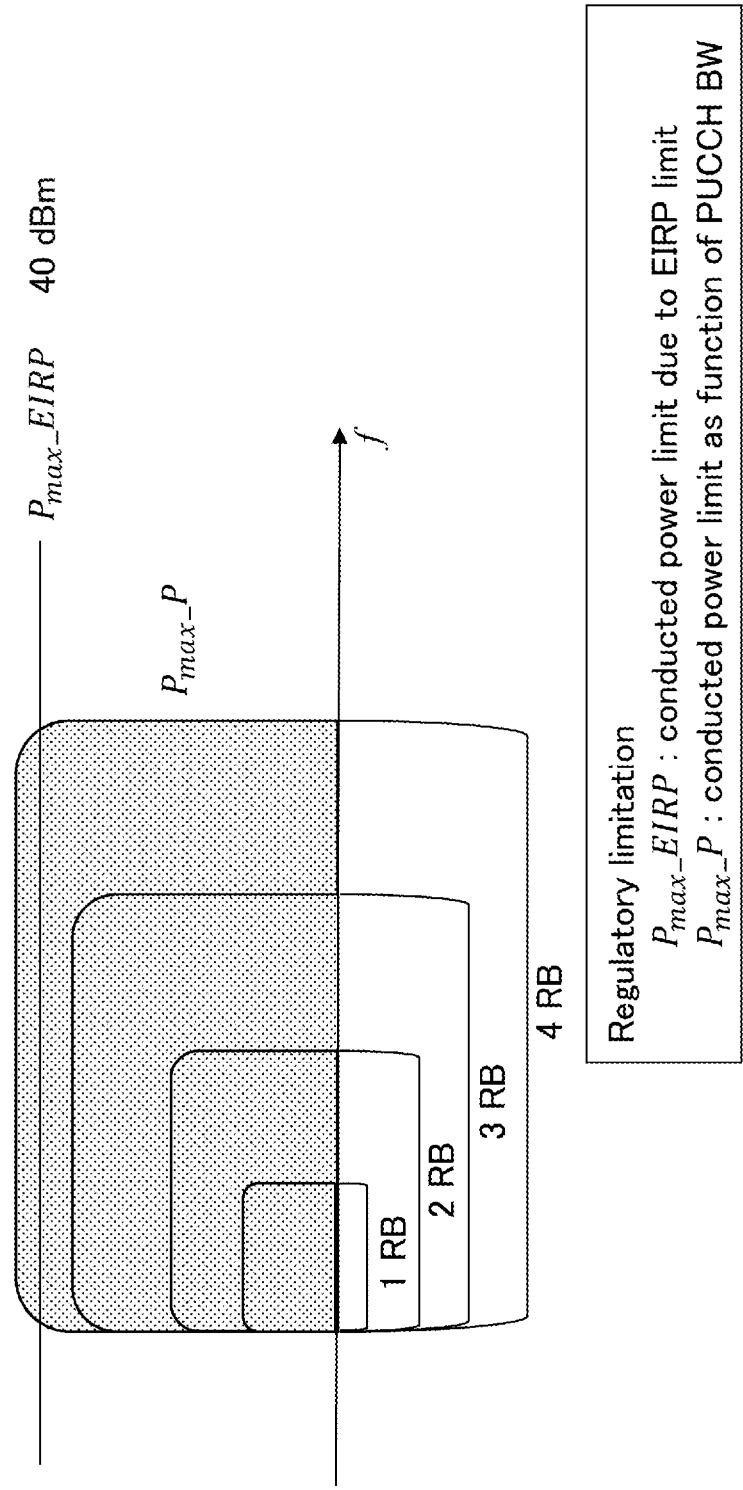
FIG. 4 is a diagram showing the maximum transmission power for each number of RBs.

Here, FIG. 4 shows the relationship between the number of resource blocks (RBs) used for PUCCH transmission and transmission power when the radiation bandwidth (BW) is less than 100 MHz. As shown in FIG. 4, a number of RBs greater than 1 can be used such that the transmission power becomes less than or equal to the limited maximum transmit power.

(Number of RBs of PUCCH)

In the existing PUCCH format0/1/4, only one PRB (Physical Resource Block) allocation is supported. However, the transmission BW is not large enough to obtain the maximum transmission power under the regulation of the unlicensed band of 60 GHz, for example.

Therefore, in order to achieve as high transmission power as possible under the regulation, it can be considered to increase the number of RBs to allocate to PUCCH format0/1/4. As an example, it can be considered to be able to allocate up to 12 RBs when SCS is 120 kHz, to be able to allocate up to 3 RBs when SCS is 480 kHz, and to be able to allocate up to 2 RBs when SCS is 960 KHz.

For example, when SCS is 120 kHz, the number of RBs of each PUCCH format in Rel-15/16 shown in the upper part of FIG. 5 may be changed to the number of RBs shown in the lower part of FIG. 5.

Here, PUCCH resources before dedicated PUCCH resource configuration in Rel-15/16 will be described (Non-Patent Document 1). The PUCCH resource before the dedicated PUCCH resource configuration is, for example, a PUCCH resource used by the terminal 20 to transmit a HARQ-ACK feedback of Msg.4 before RRC connection is performed. Hereinafter, when a PUCCH resource is mentioned without being particularly specified, the PUCCH resource is a PUCCH resource before the dedicated PUCCH resource configuration.

However, the techniques described in the following Examples 1 to 4 may be applied to a PUCCH other than the PUCCH before the dedicated PUCCH resource configuration.

A process in which the terminal 20 determines a PUCCH resource to be used by the terminal 20 in Rel-15/16 will be described.

Figure 6:
FIG. 6 is a diagram for explaining an example of PUCCH resources.

The terminal 20 specifies one row of a cell-specific PUCCH resource set table shown in FIG. 6 (*a*) from a value of 4-bit RMSI (to be more specific, for example, pucch_ResourceCommon) included in SIB1 received from the base station 10, and specifies a PUCCH resource set defined in the row. As shown in FIG. 6 (*a*), here, a PUCCH format, a first symbol, the number of symbols, PRB offset, and a set of initial CS indexes (cyclic shift) are specified. The PRB offset is a frequency width (represented by the number of RBs) from an end in the frequency direction in a BWP (bandwidth part) used by the terminal 20.

Furthermore, the terminal 20 determines a PUCCH resource to use from a value (PUCCH resource indicator field, PRI) of 3 bits in a DCI (to be more specific, DCI format1_0 or 1_1) received from the base station 10 through a PDCCH and an index (1 bit) of the first CCE in the PDCCH.

To be more specific, for example, when the 4-bit RMSI (index of the table) is 1101, the PUCCH resource is determined by the rule shown in FIG. 6 (*b*).

Here, when the terminal 20 receives 000 as the value of DCI's 3 bits and the 1-bit value obtained from the CCE index is 0, the PUCCH resource is determined such that a hopping direction is 0, a UE-specific PRB offset is 0, and an initial CS index is 0. The UE-specific PRB offset is a UE-specific offset, and a value obtained by adding the UE-specific offset to the cell-specific offset is an offset used by the terminal 20.

Figure 7:
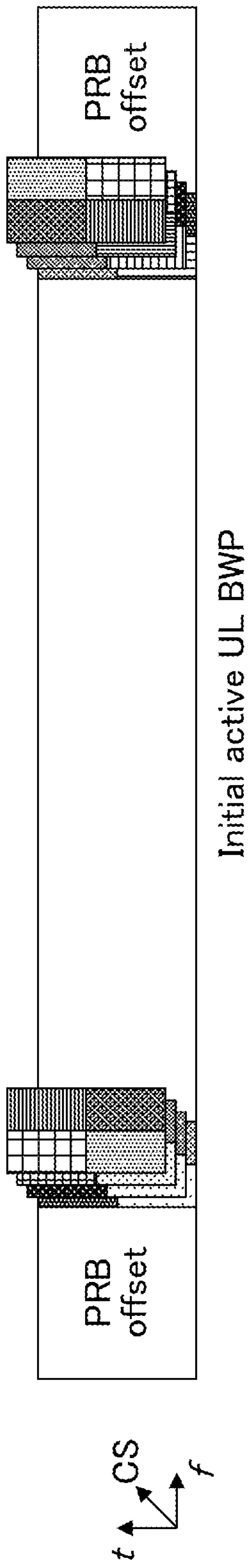
FIG. 7 is a diagram for explaining an example of PUCCH resources.

FIG. 7 shows an example of PUCCH resource allocation (PUCCH resource set) in a case where two users are multiplexed in the frequency domain, two users are multiplexed in the time domain, and there are four types of CSs. The PRB offset is an offset from the end of the BWP. User multiplexing in the frequency domain is performed by the UE-specific PRB offset in the frequency domain. Further, by frequency hopping, frequencies that differ by half the number of allocated symbols are used.

Problem, Outline of Embodiment

In the existing technology (for example, Non-Patent Document 1), a PUCCH format0 or 1 (which may be denoted as PF0/1) is used as a PUCCH resource before dedicated PUCCH resource configuration, and the number of allocated RBs is 1.

However, as described above, in the operation of 52.6 to 71 GHz, from the viewpoint of transmission power, it is necessary to use RBs the number of which is larger than 1 even in the PUCCH resource before the dedicated PUCCH resource configuration. For example, it can be considered to use 30 or more RBs for PUCCH transmission.

Figure 8:
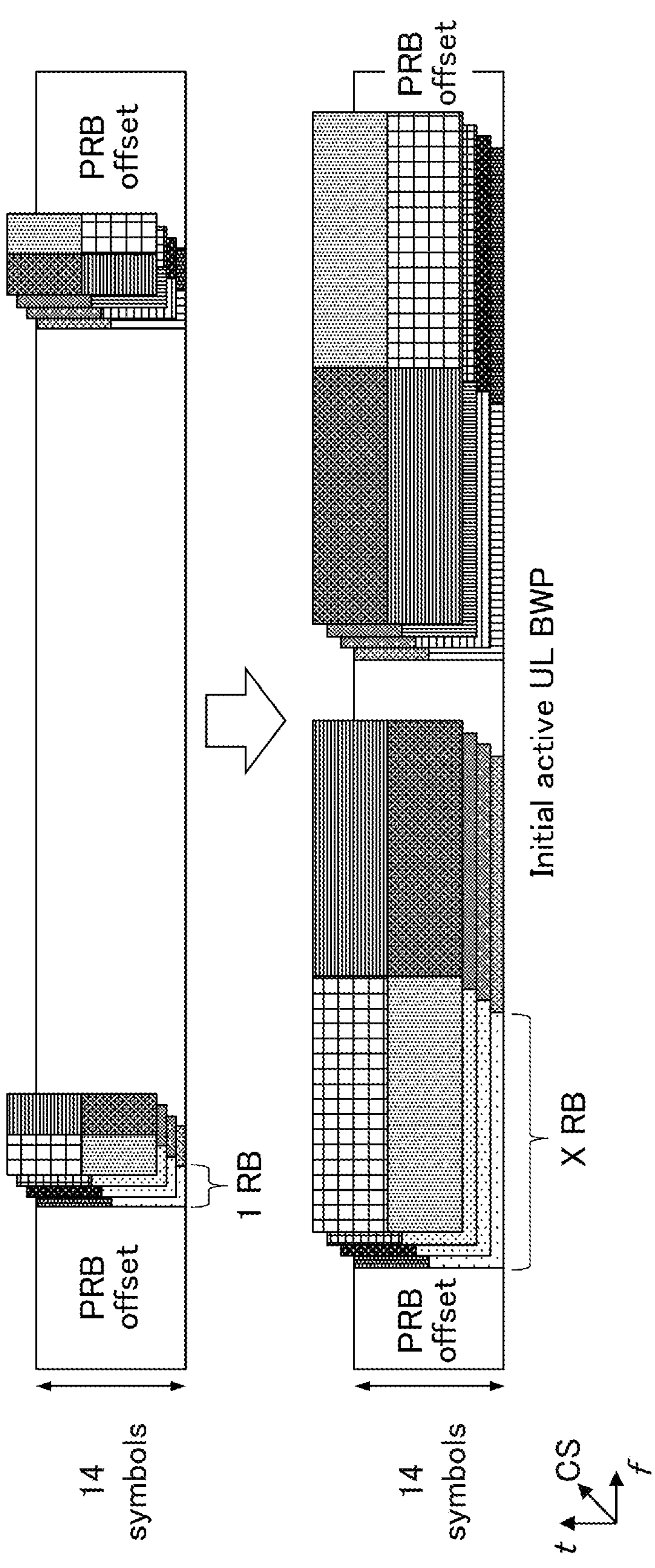
FIG. 8 is a diagram for explaining an outline of an embodiment.

Therefore, in the present embodiment, as illustrated in FIG. 8, X RBs, which is a number greater than 1, are allocated to one terminal 20 as a PUCCH resource (specifically, a frequency resource).

In the related technique, there is no proposal about how to specifically allocate X RBs greater than 1 as a PUCCH resource.

Furthermore, for increasing the number of RBs of a PUCCH resource, there is a problem in that there is a possibility that FDM resources (resources in the frequency domain) are insufficient according to the existing specification for the PUCCH resource set.

Hereinafter, a technique for enabling X RBs larger than 1 to be used as a PUCCH resource before the dedicated PUCCH resource configuration will be described in detail.

Basic Operation Example

An example of a basic operation of the radio communication system according to the present embodiment will be described with reference to FIG. 9. In S101, the terminal 20 receives a SIB1 transmitted from the base stations 10. The SIB1 includes the above-described 4-bit RMSI (index specifying a row of the table). Note that the 4-bit RMSI being included in the SIB1 is an example, and the 4-bit RMSI may be included in information other than the SIB1 (example: MIB, SSB, SIB other than SIB1).

The terminal 20 (and the base station 10) holds a table of cell-specific PUCCH resource sets. The terminal 20 specifies a PUCCH resource set (cell-specific PUCCH resource set) indicated in one row of the table based on the value of 4 bits received in S101.

In S102, the terminal 20 receives a DCI by a PDCCH, and specifies a UE-specific PUCCH resource based on a 3-bit value (PRI) and a 1-bit value obtained from a CCE index. In S103, an uplink signal is transmitted by the specified PUCCH resource.

Hereinafter, specific processing operations according to the present embodiment will be described as Examples 1 to 4. In each Example, an example of allocating a plurality of PRBs for PUCCH format0/1 before dedicated PUCCH resource configuration will be described. The outline is as follows. Example 1 is a basic example, and it is assumed that Examples 2-4 are performed on the premise of Example 1. However, any of Examples 2 to 4 may be independently performed without assuming Example 1.

Example 1: Operation Example related to configuration of the number of RBs

Example 2: Resource configuration of frequency domain

Cell-specific PRB offset value

UE-specific PRB offset value

Frequency hopping

Example 3: Resource configuration of time domain

Example 4: OCC

Examples 1 to 4 will be described below. A plurality of examples described in Examples 1 to 4 can be implemented in combination.

Example 1

In Example 1, an example related to a method of configuration of the number of RBs in a PUCCH resource before a dedicated PUCCH resource is configured will be described. Example 1 includes Examples 1-1 to 1-4, and each of them will be described.

Example 1-1

In the Example 1-1, a common value is defined in a specification or the like as the number of RBs in the PUCCH resource before the dedicated PUCCH resource configuration. The terminal 20 performs transmission by the PUCCH in S103 of FIG. 9 using the number of RBs according to the definition, and the base station 10 performs reception by the PUCCH.

As an example, the number of RBs is defined as 12 when SCS is 120/480 kHz for PF0/1 before the dedicated PUCCH resource configuration. More specifically, for example, as shown in FIG. 10, the number of RBs is defined for each combination of PF and SCS. When the rule illustrated in FIG. 10 is applied, for example, in a case where PF1 is used and 120 kHz is used as SCS, the terminal 20 determines the number of RBs as 12 and performs PUCCH transmission using the 12 RBs.

Example 1-2

In Example 1-2, the number of cell-specific RBs is defined in the PUCCH resource set table before the dedicated PUCCH resource configuration. An example of the table in this case is shown in FIG. 11. In the table shown in FIG. 11, a column of the number of RBs is added as compared with the table shown in FIG. 6 (*a*). In the example of FIG. 11, the number of RBs is defined for each of the case where SCS is 120 kHz and the case where SCS is 480 kHz. That is, the number of RBs is defined for each SCS. However, this is merely an example, and the number of RBs for SCS other than 120 kHz and 480 kHz may be included, or the number of RBs common to a plurality of SCSs may be defined.

Figures 9, 10:
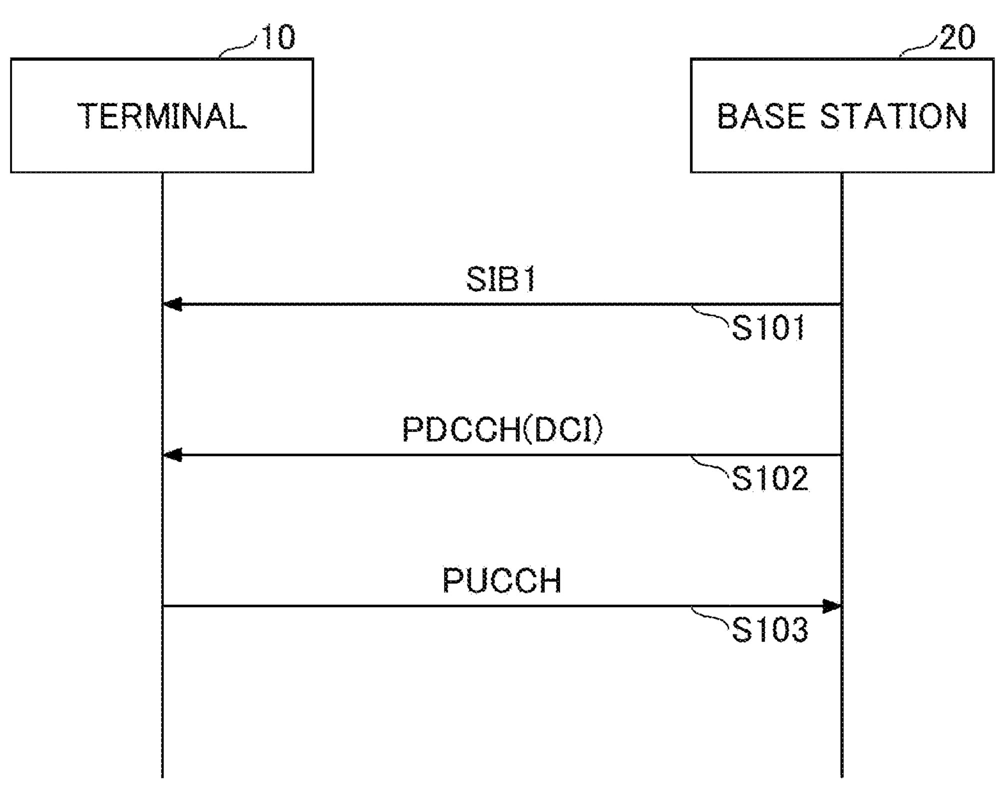
FIG. 9 is a diagram showing an example of a basic operation of the system.
FIG. 10 is a diagram for explaining Example 1.

The terminal 20 located in a certain cell specifies a PUCCH resource set to be used in the cell based on a 4-bit value (index) received from the base stations 10 in S101 of FIG. 9. As illustrated in FIG. 11, since the number of RBs is associated with a PUCCH resource set associated with the index and SCS, the terminal 20 can specify the number of RBs used for the PUCCH transmission corresponding to the SCS by specifying the PUCCH resource set.

Example 1-3

In Example 1-3, the cell-specific number of RBs is notified from the base station 10 to the terminal 20 by a SIB1. The SIB1 is notified from the base station 10 to the terminal 20 in S101 of FIG. 9, for example. For example, the number of RBs that does not depend on SCS or PUCCH resource sets may be notified from the base station 10 to the terminal 20 by the SIB1.

Also, a relationship between the number of RBs and PF/SCS may be notified by the SIB1. In this case, the terminal 20 determines the number of RBs used for PUCCH transmission from the above relationship based on the PF notified by a 4-bit RMSI, the SCS used in the cell, or both the PF notified by the 4-bit RMSI and the SCS used in the cell.

As an example, it is assumed that information illustrated in FIG. 10 is notified from the base station 10 to the terminal 20 as the relationship between the number of RBs and PF/SCS by the SIB1. Further, assuming that the table shown in FIG. 6 (*a*) is used, for example, if 0011 (PF=1) is notified as the 4-bit RMSI and the SCS is 120 kHz, the terminal 20 determines 12 as the number of RBs.

Example 1-4

In Example 1-4, for example, in S102 of FIG. 9, the number of RBs in the PUCCH resource before the dedicated PUCCH resource configuration is notified as a UE-specific value from the base station 10 to the terminal 20. This notification may be made by a 3-bit value (PRI) of a DCI, may be made by a 1-bit value derived from a CCE index, or may be made by a combination of a 3-bit PRI value and a 1-bit value derived from a CCE index. The number of RBs may be defined for each SCS.

As an example, assuming that the table of PUCCH resource sets illustrated in FIG. 6 (*a*) is defined, the terminal 20 determines the number of RBs used for PUCCH transmission by the terminal 20 for one PUCCH resource set among the PUCCH resource sets according to a rule illustrated in FIG. 12. For example, when the SCS is 120 kHz or 480 kHz and the terminal 20 receives 000 as the 3-bit PRI, the terminal 20 determines that the number of RBs is 5 from FIG. 12. Note that, although the number of RBs is determined without depending on the value of 1-bit derived from the CCE index in the example of FIG. 12, a rule may be defined such that the number of RBs varies depending on the value of the 1-bit derived from the CCE index. Further, in the example of FIG. 12, the number of RBs is determined without depending on the SCS, but a rule may be defined such that the number of RBs varies depending on the SCS.

Further, a plurality of values of the number of RBs may be notified or defined by assuming a plurality of UE power classes. The terminal 20 determines the number of RBs corresponding to its own power class as the number of RBs to use for PUCCH transmission.

As an example, it is assumed that a relationship between UE power class, SCS, and the number of RBs as illustrated in FIG. 13 is notified from the base station 10 to the terminal 20, or the relationship is defined. When the power class of the terminal 20 is 1 and the SCS is 120 kHz, the terminal 20 determines the number of RBs to use for PUCCH transmission as 20 based on the relationship illustrated in FIG. 13.

Combination of Examples 1-1 to 1-4

Examples 1-1 to 1-4 can be carried out in any combination. For example, the number X of RBs, which is the common value described in Example 1-1, may be defined, and a value in the range of 1 to X may be notified from the base station 10 to the terminal 20 as a cell-specific value for each cell as in Example 1-2.

The number Y of RBs specific to the cell described in Example 1-2 may be notified to the terminal 20 (or defined), and the terminal 20 may determine a value of the number of RBs used by the terminal 20 from the range of 1 to Y.

In the Examples 1-1 to 1-4, when the number of RBs is not notified or defined, the terminal 20 may assume that 1 RB is used for PUCCH transmission.

Other Examples

Depending on the number of RBs of the PUCCH resource, "base sequence design, or time/frequency domain resource, or (base sequence design and time/frequency domain resource)" for the PUCCH resource before dedicated PUCCH resource configuration may be defined, configured, or notified.

For example, the following may be applied to accommodate a larger number of RBs than the current FDM capacity (e.g., 20 RB for SCS of 120 kHz in 100 MHzBW). Details of the following will be described in Examples 2 to 4 described later.

FDM capacity adjustment

Non-use of frequency hopping

Increase TDM capacity

Application of TD-OCC

According to the Example 1, the terminal 20 can perform transmission by a PUCCH using RBs the number of which is larger than one.

Example 2

Next, Example 2 will be described. In the Example 2, a description will be given for resource configuration in the frequency domain in a case where the number of RBs that can be used as a PUCCH resource is greater than 1 as described in the Example 1.

Specifically, at least a cell-specific PRB offset value or a UE-specific PRB offset value is determined. The PRB offset value may be defined for each SCS/PF/UE power class, or may be notified from the base station 10 to the terminal 20 for each SCS/PF/UE power class. In the following, examples for the cell-specific PRB offset value will be described in Examples 2-1-1 to 2-1-3, and examples for the UE-specific PRB offset value will be described as Examples 2-2-1 to 2-2-3. An example related to frequency hopping will be described as Example 2-3.

Example 2-1-1: Cell-Specific PRB Offset Value

In Example 2-1-1, a cell-specific PRB offset value is defined in a cell-specific PUCCH resource set table. FIG. 14 illustrates an example of a cell-specific PUCCH resource set table including a column of cell-specific PRB offset values.

The terminal 20 specifies, from the table, a PUCCH resource set of a cell to which the terminal 20 belongs based on a 4-bit RMSI received from the base station 10, and specifies a PRB offset value in the PUCCH resource set. For example, in the example of FIG. 14, when the 4-bit index is 1101, the terminal 20 determines the cell-specific PRB offset value as 10.

Example 2-1-2: Cell-Specific PRB Offset Value

In Example 2-1-2, for example, in S101 of FIG. 9, a cell-specific PRB offset value is notified from the base station 10 to the terminal 20 by a SIB1. In this case, for example, the cell-specific PRB offset value is not defined in the PUCCH resource set table before dedicated PUCCH resource configuration, and the cell-specific PRB offset value is independently notified from the base station 10 to the terminal 20 by the SIB1.

Example 2-1-3: Cell-Specific PRB Offset Value

In Example 2-1-3, the terminal 20 determines a cell-specific PRB offset value by the number of RBs of a PUCCH resource and a cell-specific PRB offset index designated by the 4-bit RMSI.

The above-described cell-specific PRB offset index may be defined for multiple RB allocation, or may be a cell-specific PRB offset value for 1 RB allocation (example: PRB offset in FIG. 6 (*a*)).

The method of determining the cell-specific PRB offset value by the number of RBs of the PUCCH resource and the cell-specific PRB offset index is not limited to a specific method, but, for example, a value obtained by multiplying the number of RBs of the PUCCH resource by the cell-specific PRB offset index is used as the cell-specific PRB offset value.

Note that, when the number of RBs of the PUCCH resource is not notified (that is, when it is assumed that 1 RB is used), the cell-specific PRB offset value defined in the PUCCH resource set table for 1 RB allocation (example: FIG. 6 (*a*)) may be used.

A more specific example in the Example 2-1-3 will be described. Here, a cell-specific PUCCH resource set table shown in FIG. 15 is used. As shown in FIG. 15, the table is provided with a column of PRB offset index.

Figure 16:
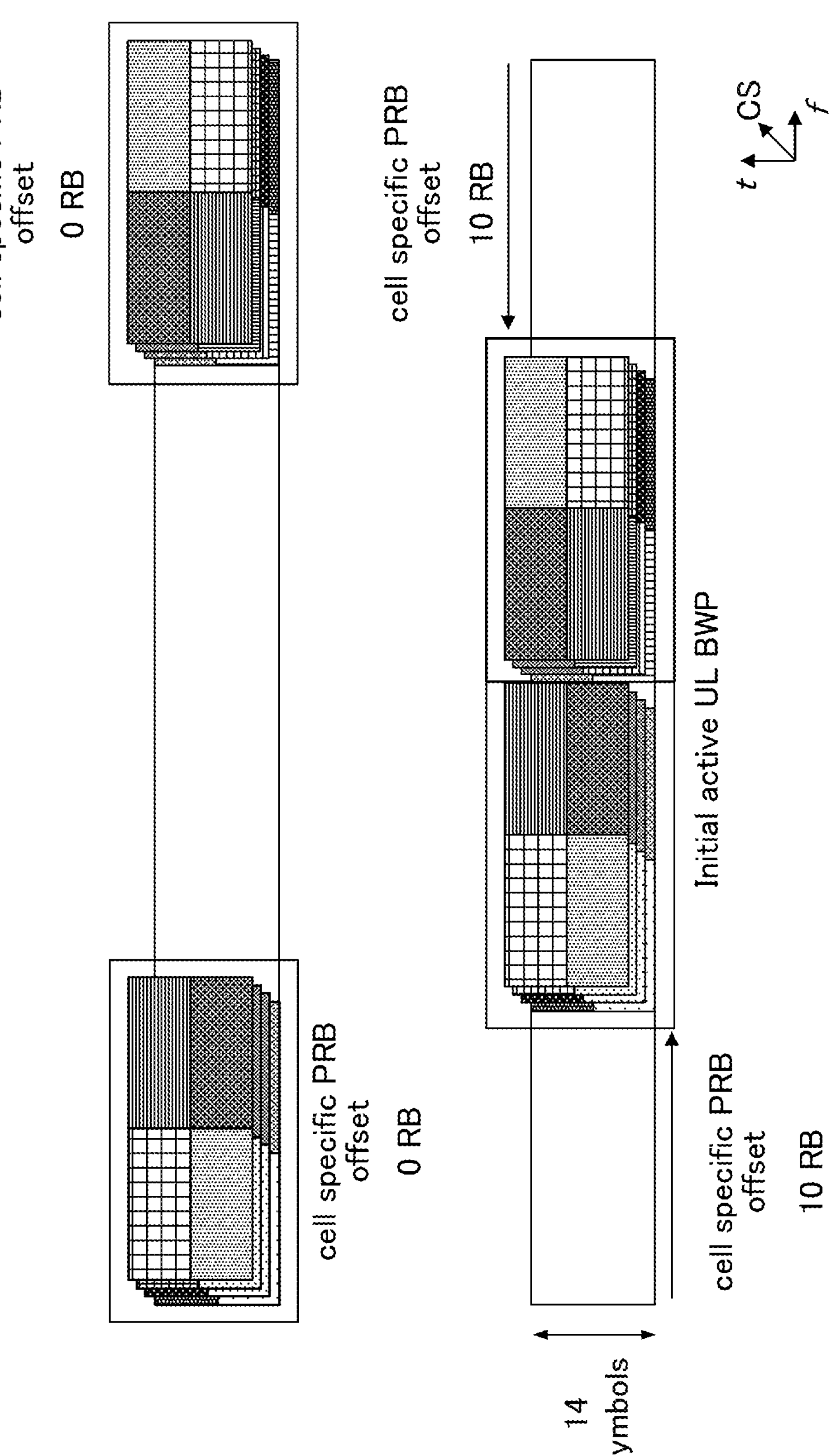
FIG. 16 is a diagram for explaining Example 2.

In this case, for example, when the number of RBs of the PUCCH resource is 5 and the 4-bit RMSI is 1100, since the cell-specific PRB offset index is 0 from the table, the terminal 20 calculates the cell-specific PRB offset value as $0\times5=0$. The PUCCH resource set in this case is shown in the upper part of FIG. 16.

For example, when the number of RBs of the PUCCH resource is 5 and the 4-bit RMSI is 1101, since the cell-specific PRB offset index is 2 from the table, the terminal 20 calculates the cell-specific PRB offset value as $2\times5=10$. The PUCCH resource set in this case is shown in the lower part of FIG. 16.

Example Common to Examples 2-1-1 to 2-1-3

In Example 2, the plurality of cell-specific PUCCH resource sets defined in the table may overlap in the frequency domain. FIG. 17 shows an example of a table in the case where the overlapping is permitted. FIG. 17 is a table assuming the Example 2-1-1 as an example.

FIG. 18 shows an example of a PUCCH resource set in a case where two users can be multiplexed in the frequency domain. The upper part of FIG. 18 shows a PUCCH resource set when the index is 1100 (PRB offset=0), the middle part of FIG. 18 shows a PUCCH resource set when the index is 1101 (PRB offset=5), and the lower part of FIG. 18 shows a PUCCH resource set when the index is 1110 (PRB offset=10). As shown in FIG. 18, overlap of 5 RBs is allowed between PUCCH resource sets. Note that, when the time and frequency resources are shared between cells, the cyclic shift in the resources may be different between the cells.

Figure 20:
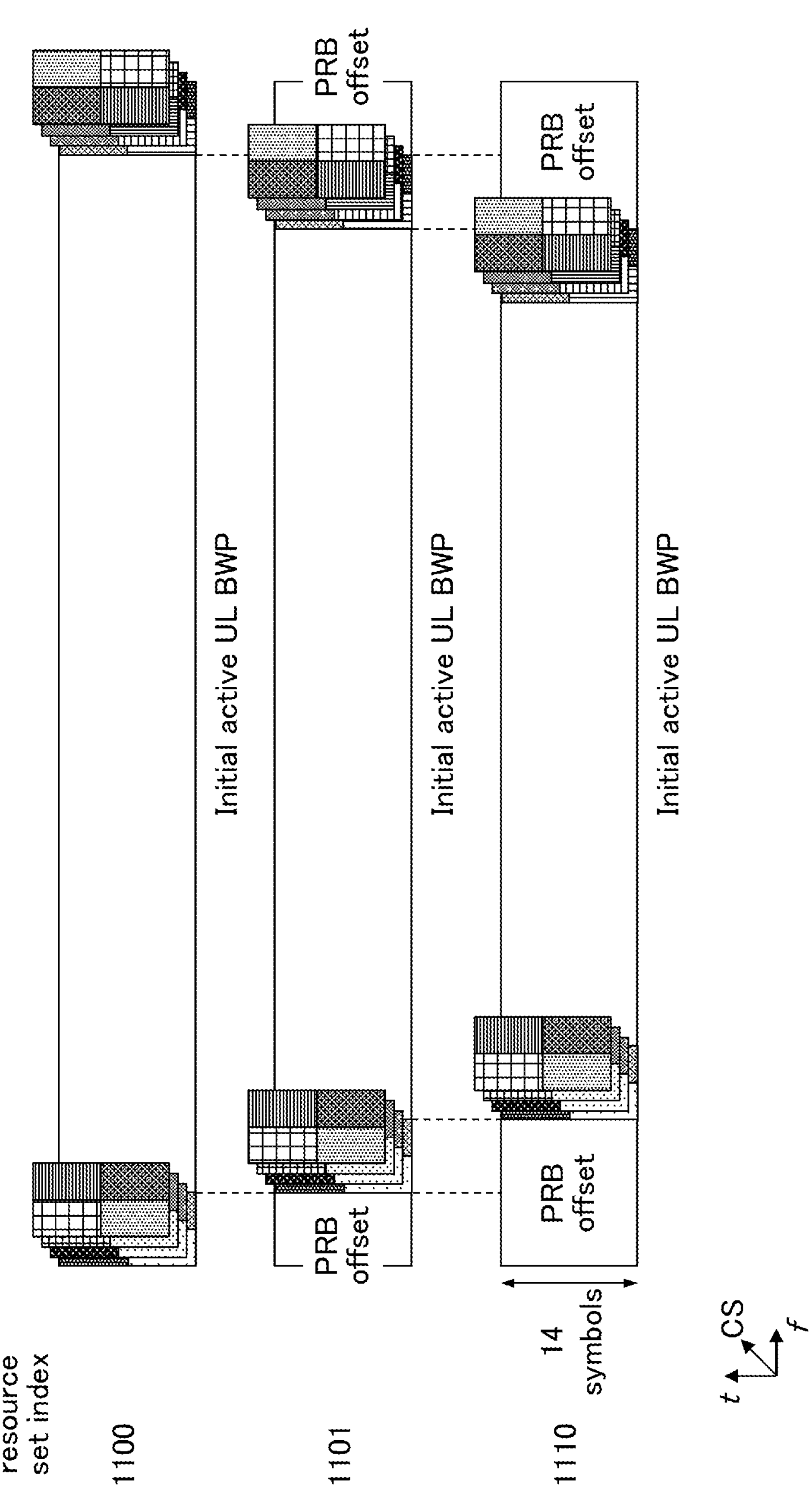
FIG. 20 is a diagram for explaining Example 2.

For comparison, a table (FIG. 19) and an example of a PUCCH resource set (FIG. 20) in a case where overlapping is not allowed based on the existing rule are illustrated.

As illustrated in FIGS. 17 and 18, by allowing the overlap of time and frequency resources in the PUCCH resource sets, the terminal 20 can perform PUCCH transmission in a wider bandwidth, compared to a case where the overlap is not allowed (FIGS. 19 and 20), that is, a case where complete FDM multiplexing is performed between cells.

Example 2-2-1: UE-Specific PRB Offset Value

In Example 2-2-1, a UE-specific PRB offset value for multiple RB allocation is defined. FIG. 21 shows an example of rule contents (rules) including UE-specific PRB offset values for multiple RB allocation. This is different from the existing rule contents (example: FIG. 6 (*b*)) in that "5" is included instead of "1" as a UE-specific PRB offset value.

The terminal 20 determines a UE-specific PRB offset value to be used by the terminal 20 based on a 3-bit value of a DCI received from the base station 10 (or a 1-bit value derived from the 3-bit value of the DCI and a CCE index).

For example, when the 3-bit value is 010 in the example of FIG. 21, the terminal 20 determines the UE-specific PRB offset value as 5.

Example 2-2-2: UE-Specific PRB Offset Value

In Example 2-2-2, the terminal 20 determines a UE-specific PRB offset value by the number of RBs of the PUCCH resource and a UE-specific PRB offset index designated by a 3-bit value of a DCI (or a 1-bit value derived from the 3-bit value of the DCI and a CCE index).

The above-described UE-specific PRB offset index may be defined for multiple RB allocation, or may be a UE-specific PRB offset value for 1 RB allocation (example: PRB offset in FIG. 6 (*b*)).

A method for the terminal 20 to determine the UE-specific PRB offset value from the number of RBs of the PUCCH resource and the UE-specific PRB offset index is not limited to a specific method, but, for example, the UE-specific PRB offset value is determined as a value obtained by multiplying the number of RBs of the PUCCH resource and the UE-specific PRB offset index.

Note that, when the number of RBs of the PUCCH resource is not notified (that is, when it is assumed that 1 RB is used), it is possible to use the UE-specific PRB offset value defined for 1 RB allocation.

A more specific example of the Example 2-2-2 will be described. Here, assume that a PUCCH resource set with a cell-specific PRB offset value of 5 is used in a certain cell, and assume that a UE-specific PUCCH resource is determined from this PUCCH resource set based on the rule contents shown in FIG. 22.

In this case, for example, when the number of RBs of the PUCCH resource is 5 and the 3-bit value of the DCI is 000, since the UE-specific PRB offset index is 0 from FIG. 22, the terminal 20 calculates the UE-specific PRB offset value as $0\times5=0$. The PUCCH resource in this case is shown in the upper part of FIG. 23.

For example, when the number of RBs of the PUCCH resource is 5 and the 3-bit value of the DCI is 010, since the UE-specific PRB offset index is 1 from FIG. 22, the terminal 20 calculates the UE-specific PRB offset value as $1\times5=5$. The PUCCH resource in this case is shown in the lower part of FIG. 23.

Common to Examples 2-2-1 to 2-2-2: UE-Specific PRB Offset Value

The number of users (terminals) to be frequency-division multiplexed (FDM) in the UE-specific PUCCH resource may be configurable for each cell.

Figure 24:
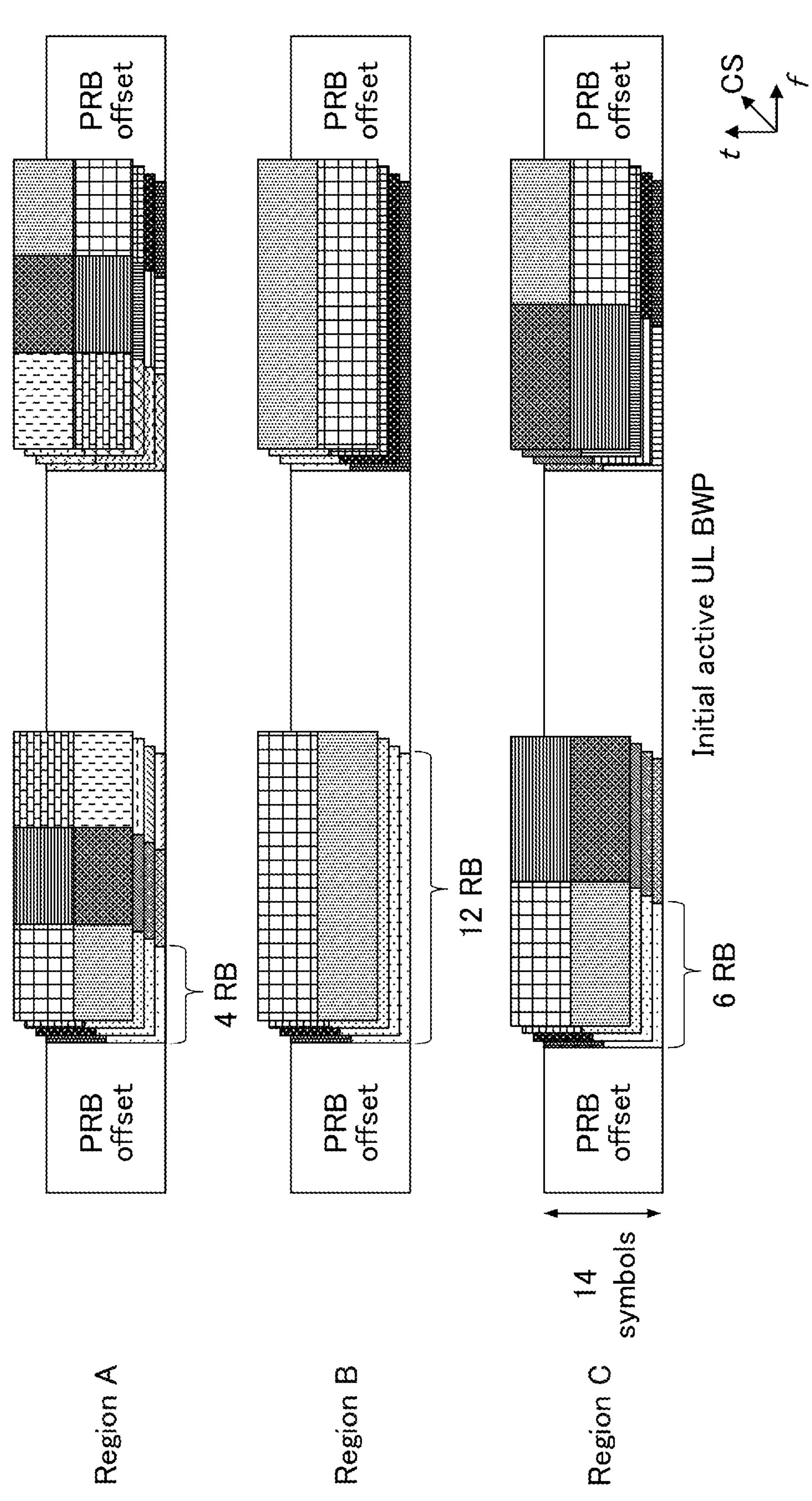
FIG. 24 is a diagram for explaining Example 2.

FIG. 24 shows an example of a case where the number of RBs of the cell-specific PUCCH resource is 12. As shown in FIG. 24, in the cell of region A, three users can be frequency-multiplexed, in the cell of region B, frequency multiplexing of a plurality of users is not performed, and in the cell of region C, two users can be frequency-multiplexed.

In the example shown in FIG. 24, in the region A, since 4 RBs are required to achieve the maximum allowable transmission power, 3 users are frequency-multiplexed in the same time domain resource. In the region B, since 12 RBs are required to achieve the maximum allowable transmission power, frequency-multiplexing on the same time-domain resource is not supported. In the region C, since 6 RBs are required to achieve the maximum allowable transmission power, 2 users are frequency-multiplexed in the same time domain resource.

Since the number of RBs required to achieve the maximum allowable transmission power can differ from region to region, it is possible to set an appropriate number of multiplexed users by setting the number of frequency-multiplexed users to be configurable for each cell as described above.

Example 2-3-1: Frequency Hopping

In Example 2-3-1, frequency hopping may not be applied in a PUCCH resource. As an example, enabled/disabled of frequency hopping may be configured in each cell.

Figure 25:
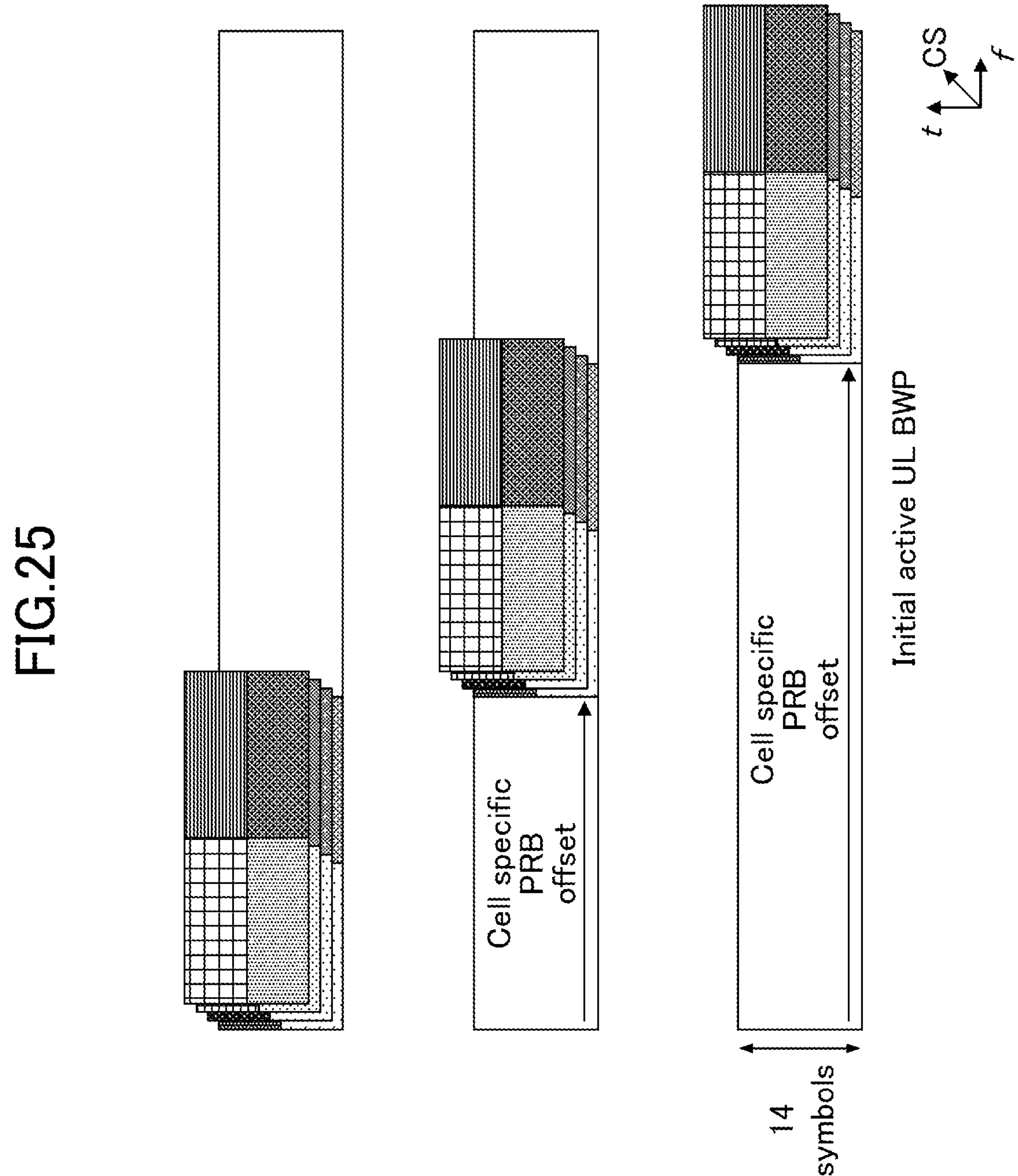
FIG. 25 is a diagram for explaining Example 2.

FIG. 25 illustrates an example of a PUCCH resource set when frequency hopping is disabled. The example of FIG. 25 illustrates an example in which the left end (for example, the low frequency side) of an UL BWP is set to a position of PRB offset=0, and the frequency position of the PUCCH resource set is shifted to the right side by a frequency width of the PRB offset. FIG. 25 is an example, and for example, the right end (for example, the high frequency side) of the UL BWP may be set to a position of PRB offset=0, and the frequency position of the PUCCH resource set may be shifted to the left side by the frequency width of the PRB offset.

As a method of notifying enabled/disabled, for example, Alt.1 or Alt.2 described below can be applied.

Alt.1)

The enabled/disabled is notified from the base stations 10 to the terminal 20 by a SIB1.

Alt.2)

The terminal 20 is implicitly notified of the enabled/disabled. For example, when the number of RBs of the PUCCH resource is larger than X (X is a natural number), frequency hopping is disabled, and when the number of RBs of the PUCCH resource is not larger than X, frequency hopping is enabled. The value of X may be defined as a higher layer parameter or may be configured from the base station 10 to the terminal 20.

In the Example 2-3-1, when frequency hopping is not performed, frequency hopping gain cannot be obtained, but the terminal 20 can perform PUCCH transmission with a larger bandwidth.

Example 2-3-2: Frequency Hopping

In Example 2-3-2, a cell-specific PRB offset value/a UE-specific PRB offset value is defined or notified from the base station 10 to the terminal 20 according to enabled/disabled of frequency hopping. Specific examples will be described as Alt.1 and Alt.2 below.

Alt.1)

In Alt.1, a PRB offset value is defined (or notified from the base station 10 to the terminal 20) for each of enabled and disabled of frequency hopping. The PRB offset value may be defined or notified for each SCS/PF/UE power class.

FIG. 26 shows an example of a cell-specific PUCCH resource set table in Alt.1. As shown in FIG. 26, a PRB offset is defined for each of the case where frequency hopping is ON and the case where frequency hopping is OFF. For example, in a case where 0010 is notified by a 4-bit RMSI and frequency hopping=ON, the terminal 20 specifies the PUCCH resource by using the PUCCH resource set of PRB offset=3 in 4-bit RMSI=0010.

Alt.2)

In Alt.2, if frequency hopping is disabled, a PRB offset value is determined from the number of RBs of the PUCCH resource and a cell-specific PRB offset index specified by a 4-bit RMSI. For example, the PRB offset value is calculated as a value obtained by multiplying the number of RBs of the PUCCH resource by the cell-specific PRB offset index.

An example of the cell-specific PUCCH resource set table in Alt. 2 is shown in FIG. 27. In this example, for example, if the number of RBs is 5 and the 4-bit RMSI is 1101 (cell-specific PRB offset index=2), the cell-specific PRB offset value is calculated as 2×5=10.

Also, in the Example 2-3-2, when frequency hopping is not performed, frequency hopping gain cannot be obtained, but the terminal 20 can perform PUCCH transmission with a larger bandwidth.

Example 3

Next, Example 3 will be described. In Example 3, in a cell-specific PUCCH resource set, users (terminals) the number of which is greater than 2 can be time division multiplexed (TDM). In the cell-specific PUCCH resource set, the number of users to be time-multiplexed may be configurable in each cell.

Specifically, in a certain cell, a UE-specific symbol offset value is notified from the base station 10 to the terminal 20 by a 3-bit value of a DCI (or a 1-bit value derived from the 3-bit value of the DCI and a CCE index), and the terminal 20 determines a time position of the PUCCH resource according to the UE-specific symbol offset value.

Figure 29:
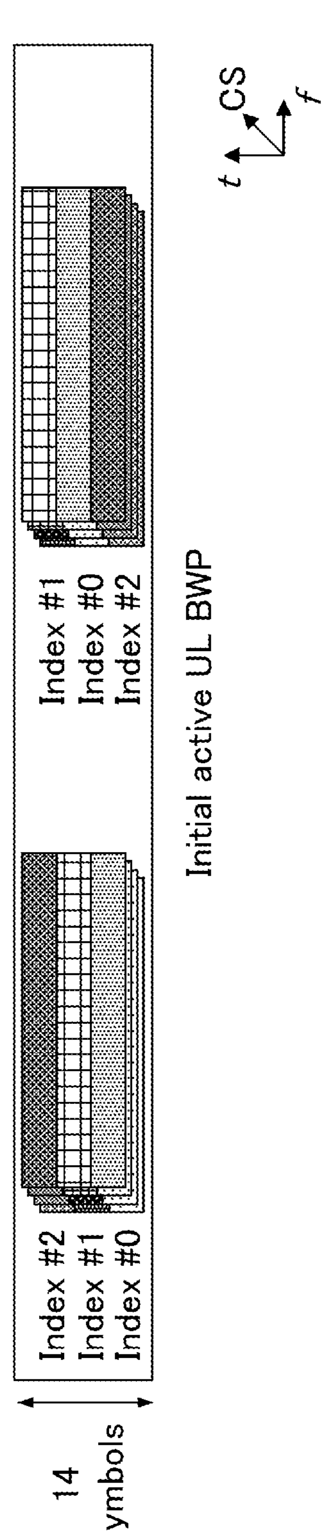
FIG. 29 is a diagram for explaining Example 3.

An example is shown in FIG. 28 and FIG. 29. FIG. 28 shows a definition of UE-specific PUCCH resources in a cell. For example, when the terminal 20 receives 000 as a 3-bit value of a DCI, the terminal 20 determines a UE-specific symbol offset index as 0 from the relationship illustrated in FIG. 28. For example, the terminal 20 performs PUCCH transmission using the PUCCH resource at the time position indicated by Index #0 in FIG. 29.

Note that the relationship between the UE-specific symbol offset index and the time domain resource of the PUCCH may be defined as a higher layer parameter or may be configured in the terminal 20 from the base station 10. The UE-specific symbol offset index may be individually notified from the base station 10 to the terminal 20.

Even if an FDM capacity decreases due to allocation of a plurality of RBs, a multiplexing capacity can be increased by increasing the number of users to be time-multiplexed as in the Example 3.

Example 4

In Example 4, the terminal 20 applies a time domain-orthogonal cover code (TD-OCC) to the PUCCH resource before dedicated PUCCH resource configuration. Thus, user (terminal) multiplexing by code is performed. Note that, although TD-OCC is used here, the method is not limited to this. For example, a frequency domain-orthogonal cover code (FD-OCC) may be used.

As an orthogonal sequence in TD-OCC, for example, an orthogonal sequence for PUCCH format1 disclosed in Non-Patent Document 2 can be used. This is shown in FIG. 30. In the example of FIG. 30, an orthogonal sequence to use is determined according to an index of the orthogonal sequence (and a PUCCH length and so on). However, this is merely an example, and the orthogonal sequence used in Example 4 is not limited to the orthogonal sequence for PUCCH format1.

Even if an FDM capacity is reduced by allocating a plurality of RBs, user (terminal) multiplexing can be performed by applying OCC as in the Example 4, and thus the multiplexing capacity can be increased.

In relation to the method of notifying the index (OCC index), Examples 4-1 to 4-3 will be described below.

Example 4-1

In Example 4-1, a cell-specific OCC index is defined or notified (indicated) from the base station 10 to the terminal 20. Specifically, the following Examples 4-1-1 and 4-1-2 are provided.

Example 4-1-1)

In Example 4-1-1, a cell-specific OCC index is defined in a PUCCH resource set table for allocating a plurality of RBs, and the terminal 20 uses the OCC index defined in the PUCCH resource set corresponding to a 4-bit RMSI received from the base station 10. That is, for example, a column of the OCC index is included in the PUCCH resource set table for allocating a plurality of RBs.

Example 4-1-2)

In Example 4-1-2, a cell-specific OCC index is notified from the base station 10 to the terminal 20 by a SIB1. In this case, the cell-specific OCC index is not defined in the PUCCH resource set table, and the cell-specific OCC index is independently notified by the SIB1.

Example 4-2

In Example 4-2, a UE-specific OCC index is notified from the base station 10 to the terminal 20. Specifically, for example, a UE-specific OCC index is defined for multiple RB allocation. The definition includes a relationship between a 3-bit value of a DCI (or a 1-bit value derived from the 3-bit value of the DCI and a CCE index) and a UE-specific OCC index.

The terminal 20 specifies a UE-specific OCC index used by the terminal 20 based on the 3-bit value of the DCI received from the base station 10 (or the 1-bit value derived from the 3-bit value of the DCI and the CCE index).

Example 4-3

In Example 4-3, a set of cell-specific OCC indexes and a UE-specific OCC index (one in the set) are notified from the base station 10 to the terminal 20.

Figure 31:
FIG. 31 is a diagram for explaining Example 4.

To be more specific, for example, a cell-specific PUCCH resource set table shown in FIG. 31 (*a*) is defined. As shown in FIG. 31 (*a*), a set of OCC indexes is defined for each cell-specific PUCCH resource set. The terminal 20 determines a specific PUCCH resource set based on a 4-bit RMSI received from the base station 10 and recognizes a set of OCC indexes. In the example of FIG. 31, if the 4-bit RMSI is 1101, the set of OCC indices is {2, 3}.

Here, if UE-specific PUCCH resources are defined as illustrated in FIG. 31 (*b*), the terminal 20 specifies a UE-specific OCC index used by the terminal 20 from {2, 3} based on a 3-bit value of a DCI received from the base station 10 (or a 1-bit value derived from the 3-bit value of the DCI and a CCE index). For example, if the 3-bit value of the DCI is 000, the OCC index is determined as 2.

In the Example 4, a default OCC index (e.g., OCC index 0) may be defined, and if any OCC index is not notified, the terminal 20 may use the default OCC index.

Example Common to Examples 1 to 4

The examples described in the Examples 1 to 4 may be applied only to operation in a band (e.g., FR2-2) of 52.6 to 71 GHz. The examples described in Examples 1 to 4 may be applied only to operation in an unlicensed band of 60 GHz.

Variation

In any of the Examples 1 to 4, the following operation may be performed.

The operation of the Examples may be executed only when capability information indicating that the terminal 20 supports the functions in the Examples is notified from the terminal 10 to the base station 20.

In the operation using the SIB1 in the Examples 1 to 4, other signals (e.g., MIB, SSB, SIB other than SIB1) may be used instead of the SIB1.

The number of bits such as 4 bits or 3 bits described in the Examples 1 to 4 is merely an example. The 4-bit RMSI may be replaced with information of any number of bits of 1 to 16 bits, for example. The 3-bit DCI may be replaced with information of any number of bits of 1 to 16 bits, for example.

The techniques described in the Examples 1 to 4 may be applied to a PUCCH other than the PUCCH before dedicated PUCCH resource configuration.

Apparatus Configuration

Next, functional configuration examples of the base station 10 and the terminal 20 that execute the processes and operations described above will be described.

<Base Station 10>

Figure 32:
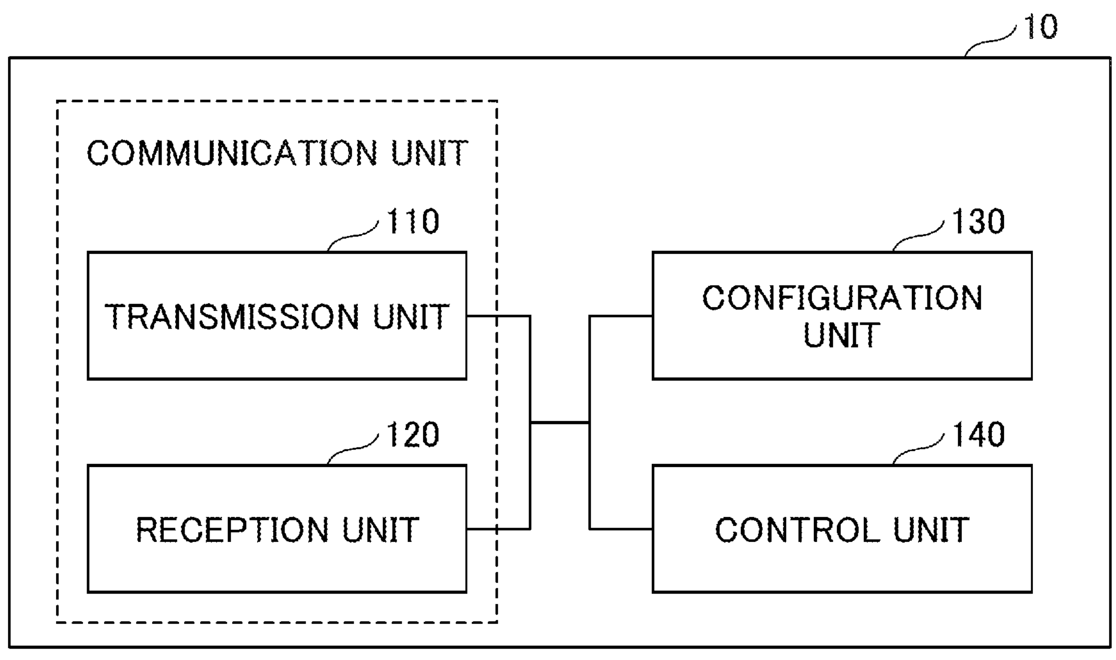
FIG. 32 is a diagram showing an example of a functional configuration of a base station 10 according to the embodiment of the present invention.

FIG. 32 is a diagram illustrating an example of a functional configuration of the base station 10. As illustrated in FIG. 32, the base station 10 includes a transmission unit 110, a reception unit 120, a configuration unit 130, and a control unit 140. The functional configuration shown in FIG. 32 is merely an example. The functional sections and the names of the functional units may be any as long as the operations according to the embodiment of the present invention can be executed. The transmission unit 110 and the reception unit 120 may be collectively referred to as a communication unit.

The transmission unit 110 includes a function of generating a signal to be transmitted to the terminal 20 side and wirelessly transmitting the signal. The reception unit 120 includes a function of receiving various signals transmitted from the terminal 20 and acquiring, for example, information of a higher layer from the received signal. The transmission unit 110 has a function of transmitting an NR-PSS, an NR-SSS, an NR-PBCH, a DL/UL control signal, a DCI by a PDCCH, data by a PDSCH, and the like to the terminal 20.

The configuration unit 130 stores configuration information configured in advance and various kinds of configuration information to be transmitted to the terminal 20 in a storage device included in the configuration unit 130, and reads the configuration information from the storage device as necessary.

The control unit 140 performs scheduling of DL reception or UL transmission of the terminal 20 via the transmission unit 110. The control unit 140 also includes a function of performing LBT. The functional unit related to signal transmission in the control unit 140 may be included in the transmission unit 110, and the functional unit related to signal reception in the control unit 140 may be included in the reception unit 120. The transmission unit 110 may be referred to as a transmitter, and the reception unit 120 may be referred to as a receiver.

<Terminal 20>

Figure 33:
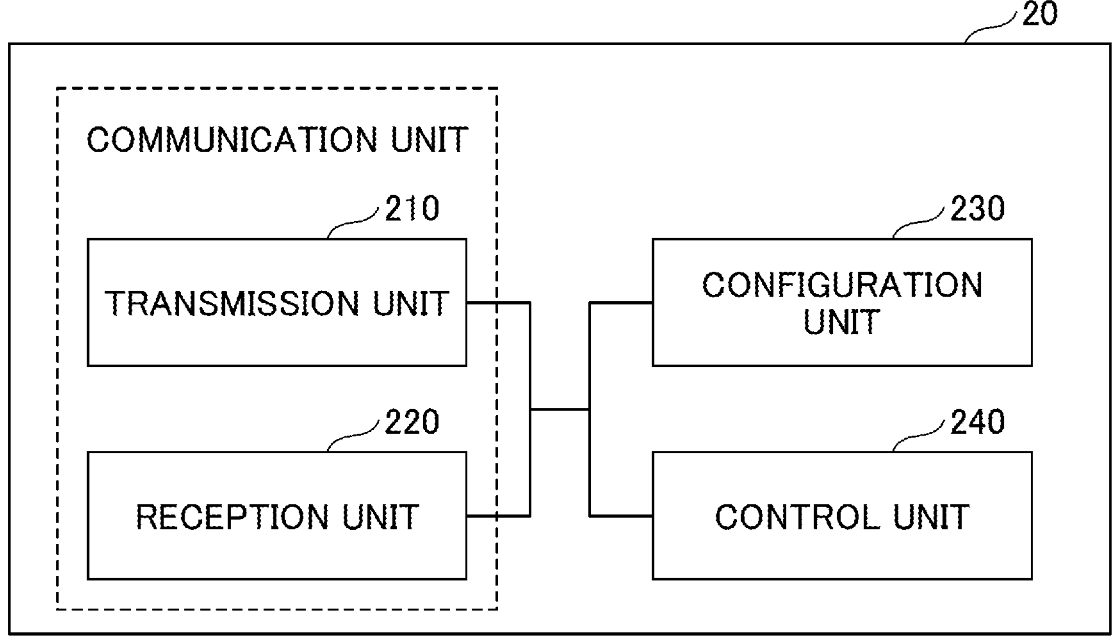
FIG. 33 is a diagram showing an example of a functional configuration of a terminal 20 according to the embodiment of the present invention.

FIG. 33 is a diagram illustrating an example of a functional configuration of the terminal 20. As illustrated in FIG. 33, the terminal 20 includes a transmission unit 210, a reception unit 220, a configuration unit 230, and a control unit 240. The functional configuration shown in FIG. 33 is merely an example. The functional sections and the names of the functional units may be any as long as the operations according to the embodiment of the present invention can be executed. The transmission unit 210 and the reception unit 220 may be collectively referred to as a communication unit.

The transmission unit 210 creates a transmission signal from the transmission data and wirelessly transmits the transmission signal. The reception unit 220 wirelessly receives various signals and acquires a signal of a higher layer from the received signal of the physical layer. Also, the reception unit 220 has a function of receiving an NR-PSS, an NR-SSS, an NR-PBCH, a DL/UL/SL control signal, a DCI in a PDCCH, data in a PDSCH and so on, transmitted from the base station 10. For example, the transmission unit 210 may transmit a physical sidelink control channel (PSCCH), a physical sidelink shared channel (PSSCH), a physical sidelink discovery channel (PSDCH), a physical sidelink broadcast channel (PSBCH), or the like to other terminals 20 as D2D communication, and the reception unit 120 may receive a PSCCH, a PSSCH, a PSDCH, a PSBCH, or the like from other terminals 20.

The configuration unit 230 stores various types of configuration information received from the base station 10 or another terminal by the reception unit 220 in a storage device included in the configuration unit 230, and reads the configuration information from the storage device as necessary. The configuration unit 230 also stores configuration information configured in advance.

The control unit 240 controls the terminal 20. The functional unit related to signal transmission in the control unit 240 may be included in the transmission unit 210, and the functional unit related to signal reception in the control unit 240 may be included in the reception unit 220. The transmission unit 210 may be referred to as a transmitter, and the reception unit 220 may be referred to as a receiver.

SUMMARY

The present embodiment provides at least a terminal and a base station described in the following item 1 to item 6.

(Item 1)

A terminal including:

a control unit configured to determine a number of resource blocks to be used in a second uplink control channel that is used before a terminal-dedicated resource for a first uplink control channel is configured as a value greater than one; and a transmission unit configured to perform transmission by the second uplink control channel using the number of resource blocks.

(Item 2)

The terminal as described in item 1, the terminal further comprising:

a reception unit configured to receive information indicating the number of the resource blocks as cell-specific information from a base station, or to receive the information indicating the number of the resource blocks as terminal-specific information from the base station.

(Item 3)

The terminal as described in item 1 or 2, wherein the control unit uses an offset according to a size of a frequency resource in the second uplink control channel to determine a frequency position of the frequency resource.

(Item 4)

The terminal as described in any one of items 1 to 3, wherein a resource in the second uplink control channel in a cell is a resource for which overlapping with a resource of the second uplink control channel in another cell is allowed.

(Item 5)

The terminal as described in any one of items 1 to 4, wherein a frequency resource of the second uplink control channel used by the terminal is used as a frequency resource of the second uplink control channel by equal to or more than two other terminals by time-division multiplexing.

(Item 6)

A base station including:

a transmission unit configured to transmit, to a terminal, information indicating a number of resource blocks to be used in a second uplink control channel that is used before a terminal-dedicated resource for a first uplink control channel is configured as cell-specific information, or to transmit, to the terminal, the information indicating the number of the resource blocks as terminal-specific information; and a reception unit configured to receive a signal transmitted by the second uplink control channel using the number of resource blocks.

According to any of item 1 to item 6, the terminal can perform transmission on an uplink control channel using RBs the number of which is larger than one. In particular, according to item 2, since the number of resource blocks can be determined based on information received from the base station, a number of resource blocks corresponding to a situation of a cell or a terminal can be used. According to item 3, since an offset corresponding to a size of a frequency resource is used, a resource at an appropriate frequency position in a bandwidth part can be used.

Also, according to item 4, since resource overlap is allowed, a larger number of resource blocks can be used. Further, according to item 5, since a plurality of users can be accommodated by time division multiplexing, a larger number of resource blocks can be used per user.

(Hardware Configuration)

The block diagrams (FIG. 32 and FIG. 33) used in the description of the embodiment described above illustrate the block of functional unit. Such function blocks (configuration parts) are attained by at least one arbitrary combination of hardware and software. In addition, an attainment method of each of the function blocks is not particularly limited. That is, each of the function blocks may be attained by using one apparatus that is physically or logically coupled, by directly or indirectly (for example, in a wired manner, over the radio, or the like) connecting two or more apparatuses that are physically or logically separated and by using such a plurality of apparatuses. The function block may be attained by combining one apparatus described above or a plurality of apparatuses described above with software.

The function includes determining, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmitting unit or the transmitter. As described above, the attainment method thereof is not particularly limited.

Figure 34:
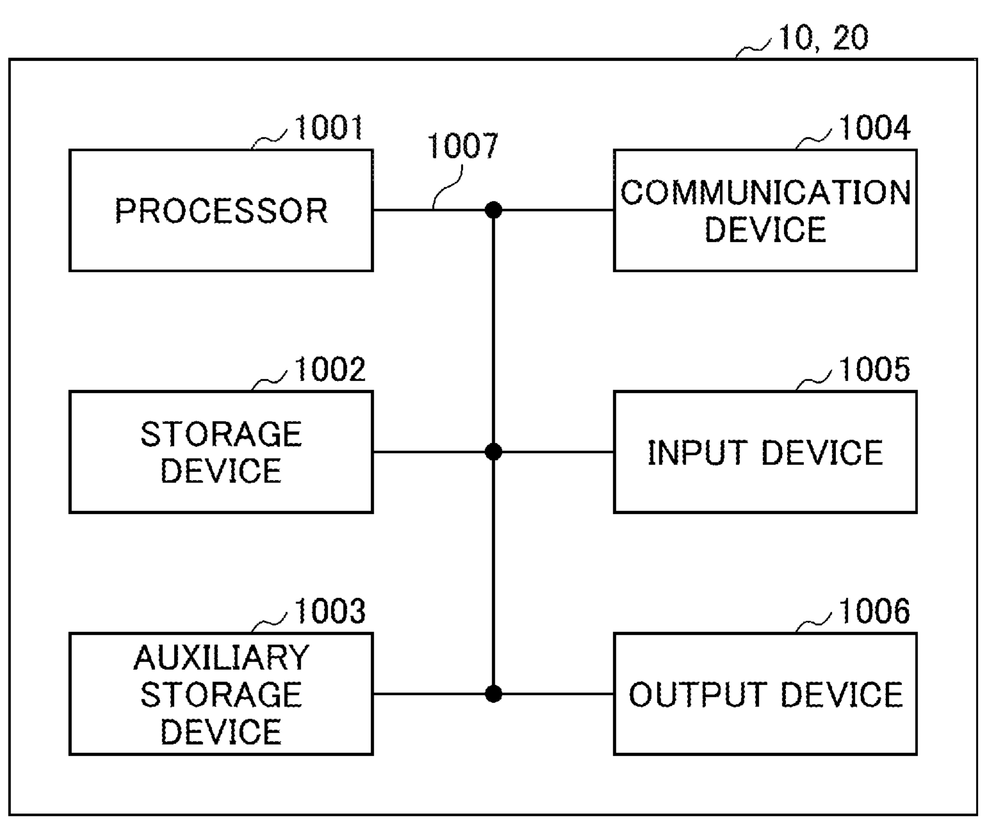
FIG. 34 is a diagram showing an example of a hardware configuration of the base station 10 or the terminal 20 according to an embodiment of the present invention.

For example, the base station 10, the terminal 20, and the like in one embodiment of this disclosure may function as a computer for performing the processing of a radio communication method of this disclosure. FIG. 34 is a diagram illustrating an example of a hardware configuration of the base station 10 and the terminal 20 according to one embodiment of this disclosure. The base station 10 and the terminal 20 described above may be physically configured as a computer apparatus including a processor 1001, a storage device 1002, an auxiliary storage device 1003, a communication device 1004, an input device 1005, an output device 1006, a bus 1007, and the like.

Note that, in the following description, the word "apparatus" can be replaced with a circuit, a device, a unit, or the like. The hardware configuration of the base station 10 and the terminal 20 may be configured to include one or a plurality of apparatuses illustrated in the drawings, or may be configured not to include a part of the apparatuses.

Each function of the base station 10 and the terminal 20 is attained by reading predetermined software (a program) on hardware such as the processor 1001 and the storage device 1002 such that the processor 1001 performs an operation, and by controlling the communication of the communication device 1004 or by controlling at least one of reading and writing of data in the storage device 1002 and the auxiliary storage device 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be attained by the processor 1001.

In addition, the processor 1001 reads out a program (a program code), a software module, data, and the like to the storage device 1002 from at least one of the auxiliary storage device 1003 and the communication device 1004, and thus, executes various processing. A program for allowing a computer to execute at least a part of the operation described in the embodiment described above is used as the program. For example, the control unit 140 of the base station 10 illustrated in FIG. 32 may be attained by a control program that is stored in the storage device 1002 and is operated by the processor 1001. In addition, for example, the control unit 240 of the terminal 20 illustrated in FIG. 33 may be attained by a control program that is stored in the storage device 1002 and is operated by the processor 1001. It has been described that the various processing described above are executed by one processor 1001, but the various processing may be simultaneously or sequentially executed by two or more processors 1001. The processor 1001 may be mounted on one or more chips. Note that, the program may be transmitted from a network through an electric communication line.

The storage device 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage device 1002 may be referred to as a register, a cache, a main memory (a main storage unit), and the like. The storage device 1002 is capable of retaining a program (a program code), a software module, and the like that can be executed in order to implement a communication method according to one embodiment of this disclosure.

The auxiliary storage device 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The storage medium described above, for example, may be a database including at least one of the storage device 1002 and the auxiliary storage device 1003, a server, and a suitable medium.

The communication device 1004 is hardware (a transmitting and receiving device) for performing communication with respect to the computer through at least one of a wired network and a radio network, and for example, is also referred to as a network device, a network controller, a network card, a communication module, and the like. The communication device 1004, for example, may be configured by including a high frequency switch, a duplexer, a filter, a frequency synthesizer, and the like, in order to attain at least one of frequency division duplex (FDD) and time division duplex (TDD). For example, a transmitting and receiving antenna, an amplifier, a transmitting and receiving unit, a transmission path interface, and the like may be attained by the communication device 1004. In the transmitting and receiving unit, the transmitting unit and the receiving unit are mounted by being physically or logically separated.

The input device 1005 is an input device for receiving input from the outside (for example, a keyboard, a mouse, a microphone, a switch, a button, a sensor, and the like). The output device 1006 is an output device for implementing output with respect to the outside (for example, a display, a speaker, an LED lamp, and the like). Note that, the input device 1005 and the output device 1006 may be integrally configured (for example, a touch panel).

In addition, each of the apparatuses such as the processor 1001 and the storage device 1002 may be connected by the bus 1007 for performing communication with respect to information. The bus 1007 may be configured by using a single bus, or may be configured by using buses different for each of the apparatuses.

In addition, the base station 10 and the terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be attained by the hardware. For example, the processor 1001 may be mounted by using at least one of the hardware.

Supplement to Embodiment

As described above, the embodiment of the invention has been described, but the disclosed invention is not limited to the embodiment, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station 10 and the terminal 20 have been described by using a functional block diagram, but such an apparatus may be attained by hardware, software, or a combination thereof. Each of software that is operated by a processor of the base station 10 according to the embodiment of the invention and software that is operated by a processor of the terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable recording media.

In addition, the notification of the information is not limited to the aspect/embodiment described in this disclosure, and may be performed by using other methods. For example, the notification of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Here, a specific operation that is performed by the base station 10 may be performed by an upper node, in accordance with a case. In a network provided with one or a plurality of network nodes including the base station 10, it is obvious that various operations that are performed in order for communication with respect to the terminal 20 can be performed by at least one of the base station 10 and network nodes other than the base station 10 (for example, MME, S-GW, or the like is considered as the network node, but the network node is not limited thereto). In the above description, a case is exemplified in which the number of network nodes other than the base station 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The information or the like that is input and output may be retained in a specific location (for example, a memory), or may be managed by using a management table. The information or the like that is input and output can be subjected to overwriting, updating, or editing. The information or the like that is output may be deleted. The information or the like that is input may be transmitted to the other apparatuses.

Judgment in this disclosure may be performed by a value represented by 1 bit (0 or 1), may be performed by a truth-value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not limited names in any respect. Further, expressions or the like using such parameters may be different from those explicitly disclosed in this disclosure.

Various channels (for example, PUSCH, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station", "fixed station", "NodeB", "eNodeB (eNB)", "gNodeB (gNB)", "access point", "transmission point", "reception point", "transmission and reception point", "cell", "sector", "cell group", "carrier", "component carrier", and the like can be interchangeably used. The base station may be referred to by a term such as a macro-cell, a small cell, a femtocell, and a picocell.

The base station is capable of accommodating one or a plurality of (for example, three) cells. In a case where the base station accommodates a plurality of cells, the entire coverage area of the base station can be classified into a plurality of small areas, and each of the small areas is capable of providing communication service by a base station sub-system (for example, an indoor type small base station (a remote radio head (RRH)). The term "cell" or "sector" indicates a part of the coverage area or the entire coverage area of at least one of the base station and the base station sub-system that performs the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication apparatus, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved at the time of a communication operation. For example, at least one of the base station and the mobile station may be an internet of things (IoT) device such as a sensor.

In addition, the base station in this disclosure may be replaced with the terminal. For example, each aspect/embodiment of this disclosure may be applied to a configuration in which communication between the base station and the terminal is replaced with communication in a plurality of terminals 20 (for example, may be referred to as device-to-device (D2D), vehicle-to-everything (V2X), and the like). In this case, the function of the base station 10 described above may be provided in the terminal 20. In addition, the words "uplink", "downlink", and the like may be replaced with words corresponding to the communication between the terminals (for example, "side"). For example, an uplink channel, a downlink channel, and the like may be replaced with a side channel.

Similarly, the terminal in this disclosure may be replaced with the base station. In this case, the function of the user terminal described above may be provided in the base station.

The terms "determining" and "deciding" used in this disclosure may involve diverse operations. "Determining" and "determining", for example, may include deeming judging, calculating, computing, processing, deriving, investigating, looking up (search, inquiry) (for example, looking up in a table, a database, or another data structure), and ascertaining, as "determining" and "determining". In addition, "determining" and "determining" may include deeming receiving (for example, receiving information), transmitting (for example, transmitting information), input, output, and accessing (for example, accessing data in a memory), as "determining" and "determining". In addition, "determining" and "determining" may include deeming resolving, selecting, choosing, establishing, comparing, and the like as "determining" and "determining". That is, "determining" and "determining" may include deeming an operation as "determining" and "determining". In addition, "determining (determining)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical or logical, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot on the basis of a standard to be applied.

The description "on the basis of" that is used in this disclosure does not indicate "only on the basis of", unless otherwise specified. In other words, the description "on the basis of" indicates both "only on the basis of" and "at least on the basis of".

Any reference to elements using the designations "first," "second," and the like, used in this disclosure, does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other names respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the existing LTE, may be a period shorter than 1 ms (for example, 1 to 13 symbols), or may be a period longer than 1 ms. Note that, a unit representing TTI may be referred to as a slot, a mini slot, and the like, but not a subframe. Also, 1 slot may be referred to as a unit time. The unit time may differ for each cell according to numerology.

Here, TTI, for example, indicates a minimum time unit of scheduling in radio communication. For example, in an LTE system, the base station performs scheduling for allocating a radio resource (a frequency bandwidth, transmission power, and the like that can be used in each of the terminals 20) in a TTI unit, with respect to each of the terminals 20. Note that, the definition of TTI is not limited thereto.

TTI may be a transmission time unit of a data packet (a transport block), a code block, a codeword, and the like that are subjected to channel coding, or may be a processing unit of scheduling, link adaptation, and the like. Note that, when TTI is applied, a time section (for example, the number of symbols) in which the transport block, the code block, the codeword, and the like are actually mapped may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a normal TTI (TTI in LTE Rel. 8-12), a normal TTI, a long TTI, a normal subframe, a long subframe, a slot, and the like. TTI shorter than the normal TTI may be referred to as a shortened TTI, a short TTI, a partial TTI (or a fractional TTI), a shortened subframe, a short subframe, a mini slot, a subslot, a slot, and the like.

Note that, the long TTI (for example, the normal TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is a resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be determined on the basis of the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a sub-carrier group (SCG), a resource element group (REG), a PRB pair, an RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it may not be assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are respectively different from C". The terms "separated", "coupled", and the like may be interpreted as with "being different".

Each aspect/embodiment described in this disclosure may be independently used, may be used by being combined, or may be used by being switched in accordance with execution. In addition, the notification of predetermined information (for example, the notification of "being X") is not limited to being performed explicitly, and may be performed implicitly (for example, the notification of the predetermined information is not performed).

As described above, this disclosure has been described in detail, but it is obvious for a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

DESCRIPTION OF SYMBOLS

10 base station
110 transmission unit
120 reception unit
130 configuration unit
140 control unit
20 terminal
210 transmission unit
220 reception unit
230 configuration unit
240 control unit
1001 processor
1002 storage device
1003 auxiliary storage device
1004 communication device
1005 input device
1006 output device

The invention claimed is:

1. A terminal capable of performing communication in a predetermined frequency band, comprising:

a receiver configured to receive, in the frequency band, configuration information of a number of resource blocks to be used in a second physical uplink control channel that is used before a terminal-dedicated resource for a first physical uplink control channel is configured;

a processor configured to determine the number of the resource blocks based on the configuration information; and a transmitter configured to perform transmission by the second physical uplink control channel using the determined number of resource blocks, wherein, when the number of the resource blocks is not notified by the configuration information, the processor determines the number of the resource blocks to be one.

2. The terminal according to claim 1, wherein the processor determines, as offsets in a frequency domain of the resource blocks, a cell-specific physical resource block offset value and a terminal-specific physical resource block offset value, the cell-specific physical resource block offset value is determined based on multiplying the number of the resource blocks by a cell-specific physical resource block offset index, and the terminal-specific physical resource block offset value is determined based on multiplying the number of the resource blocks by a terminal-specific physical resource block offset index.

3. The terminal as claimed in claim 1, wherein operations of the receiver, the processor, and the transmitter are applied only to operation in FR (Frequency Range) 2-2.

4. A communication method performed by a terminal capable of performing communication in a predetermined frequency band, the method comprising:

receiving, in the frequency band, configuration information of a number of resource blocks to be used in a second physical uplink control channel that is used before a terminal-dedicated resource for a first physical uplink control channel is configured;

determining the number of the resource blocks based on the configuration information;

when the number of the resource blocks is not notified by the configuration information, determining the number of the resource blocks to be one; and performing transmission by the second physical uplink control channel using the determined number of resource blocks.

5. A system capable of performing communication in a predetermined frequency band and comprising a terminal and a base station wherein the base station comprises:

a transmitter configured to transmit, to the terminal, configuration information of a number of resource blocks to be used in a second physical uplink control channel that is used before a terminal-dedicated resource for a first physical uplink control channel is configured; and a receiver configured to receive, from the terminal, a signal transmitted by the second physical uplink control channel using the number of resource blocks, and the terminal comprises:

a receiver configured to receive the configuration information from the base station.

6. A communication method performed by a terminal capable of performing communication in a predetermined frequency band, the method comprising:

receiving, in the frequency band, configuration information of a number of resource blocks to be used in a second physical uplink control channel that is used before a terminal-dedicated resource for a first physical uplink control channel is configured;

determining the number of the resource blocks based on the configuration information;

when the number of the resource blocks is not notified by the configuration information, determining the number of the resource blocks to be one; and performing transmission by the second physical uplink control channel using the determined number of resource blocks.

* * * * *